US012743479B2

(12) United States Patent
Endo et al.

(10) Patent No.: US 12,743,479 B2
(45) Date of Patent: Sep. 22, 2026

(54) CALCULATION DEVICE, DISPLAY DEVICE, AND COMPUTER PROGRAM PRODUCT

(71) Applicants: KABUSHIKI KAISHA TOSHIBA, Tokyo (JP); TOSHIBA DIGITAL SOLUTIONS CORPORATION, Kawasaki (JP)

(72) Inventors: Kotaro Endo, Tokyo (JP); Hayato Goto, Kawasaki Kanagawa (JP); Kosuke Tatsumura, Yokohama Kanagawa (JP); Yoshisato Sakai, Kawasaki Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 1252 days.

(21) Appl. No.: 17/476,181

(22) Filed: Sep. 15, 2021

(65) Prior Publication Data

US 2022/0019714 A1 Jan. 20, 2022

Related U.S. Application Data

(63) Continuation of application No. PCT/JP2020/009498, filed on Mar. 5, 2020.

(30) Foreign Application Priority Data

Mar. 19, 2019 (JP) ................................ 2019-050992

(51) Int. Cl.
*G06F 17/11* (2006.01)
*G06F 7/544* (2006.01)
*G06F 17/16* (2006.01)

(52) U.S. Cl.
CPC ............. *G06F 17/11* (2013.01); *G06F 7/544* (2013.01); *G06F 17/16* (2013.01)

(58) Field of Classification Search
CPC ..... G06F 17/11–13; G06F 17/16; G06F 7/544
See application file for complete search history.

(56) References Cited

U.S. PATENT DOCUMENTS

2017/0104493 A1 4/2017 Goto
2020/0089473 A1* 3/2020 Goto ...................... G06F 7/544
(Continued)

FOREIGN PATENT DOCUMENTS

JP 2017-73106 A 4/2017

OTHER PUBLICATIONS

Cleve Moler and Jack Little, “A History of MATLAB”, Proc. ACM Program. Lang. 4, HOPL, Article 81, Jun. 2020 (Year: 2020).*
(Continued)

*Primary Examiner* — Matthew D Sandifer
(74) *Attorney, Agent, or Firm* — Finnegan, Henderson, Farabow, Garrett & Dunner, LLP

(57) ABSTRACT

According to an embodiment, a calculation device includes a memory and one or more processors coupled to the memory. The one or more processors are configured to: repeat a processing procedure including a first variable update and a second variable update; and display an image on a display device. The one or more processors are further configured to: while repeating the processing procedure, output values of the updated first variables $x_i$ and second variables $y_i$, and when repetition of the processing procedure is finished, output a sign of the last updated first variable $x_i$; and display on the display device a monitoring image representing a temporal change in at least some of the first variables $x_i$ and the second variables $y_i$, based on the output values of the first variables $x_i$ and the second variables $y_i$.

10 Claims, 16 Drawing Sheets

(56) References Cited

U.S. PATENT DOCUMENTS

2020/0089731 A1* 3/2020 Tatsumura ............ G06F 7/5443
2020/0090066 A1* 3/2020 Kanao ..................... G06F 17/13
2020/0233921 A1* 7/2020 Sakai ...................... G06F 17/13
2025/0028779 A1* 1/2025 Hidaka ................... G06F 17/11
2025/0028780 A1* 1/2025 Hidaka .................... G06N 5/01

OTHER PUBLICATIONS

Oren Vardy, "History of Graphing Calculators", 2024, retrieved from https://www.meta-calculator.com/blog/history-of-graphing-calculators-and-tools/ (Year: 2024).*
Lauren Cabral, "The History of Graphing Calculators", 2022, retrieved from https://www.backthenhistory.com/articles/the-history-of-graphing-calculators (Year: 2022).*
Elizabeth Crossen et al., "Simulated Quantum Annealing Can be Exponentially Faster than Classical Simulated Annealing," 49th Annual IEEE Symposium on Foundations of Computer Science, 18 pages, arXiv:1601.03030v1 (2016).
Takahiro Inagaki et al., "A coherent Ising machine for 2000-node optimization problems," Science, vol. 354, No. 6312, pp. 603-606 (2016).
Hayato Goto, "Bifurcation-based adiabatic quantum computation with a nonlinear oscillator network", Scientific Reports, vol. 6:21686, DOI: 10.1038/srep21686, 8 pages (2016).
Yoshitaka Haribara et al., "Performance evaluation of coherent lsing machines against classical neural networks," Quantum Science and Technology, vol. 2 044002, DOI: 10.1088/2058-9565/aa8190, 8 pages (2017).

* cited by examiner

START
INITIALIZATION
$t = 0, p = 0, a = 0$
S101
LOOP
$t < T$
S102
$y_i += dt * [(p - D - x_i * x_i) * x_i - c * h_i * a]$
S121
$x_i += dt * D * y_i$
S110
$y_i += dt * c * \sum_{j=1}^{N} J_{i,j} * x_j$
S122
OUTPUT
$x_i, y_i$
S130
UPDATE
$t += dt, p += dp, a = sqrt(p)$
S140
LOOP
$t < T$
S103
END

FIG.11

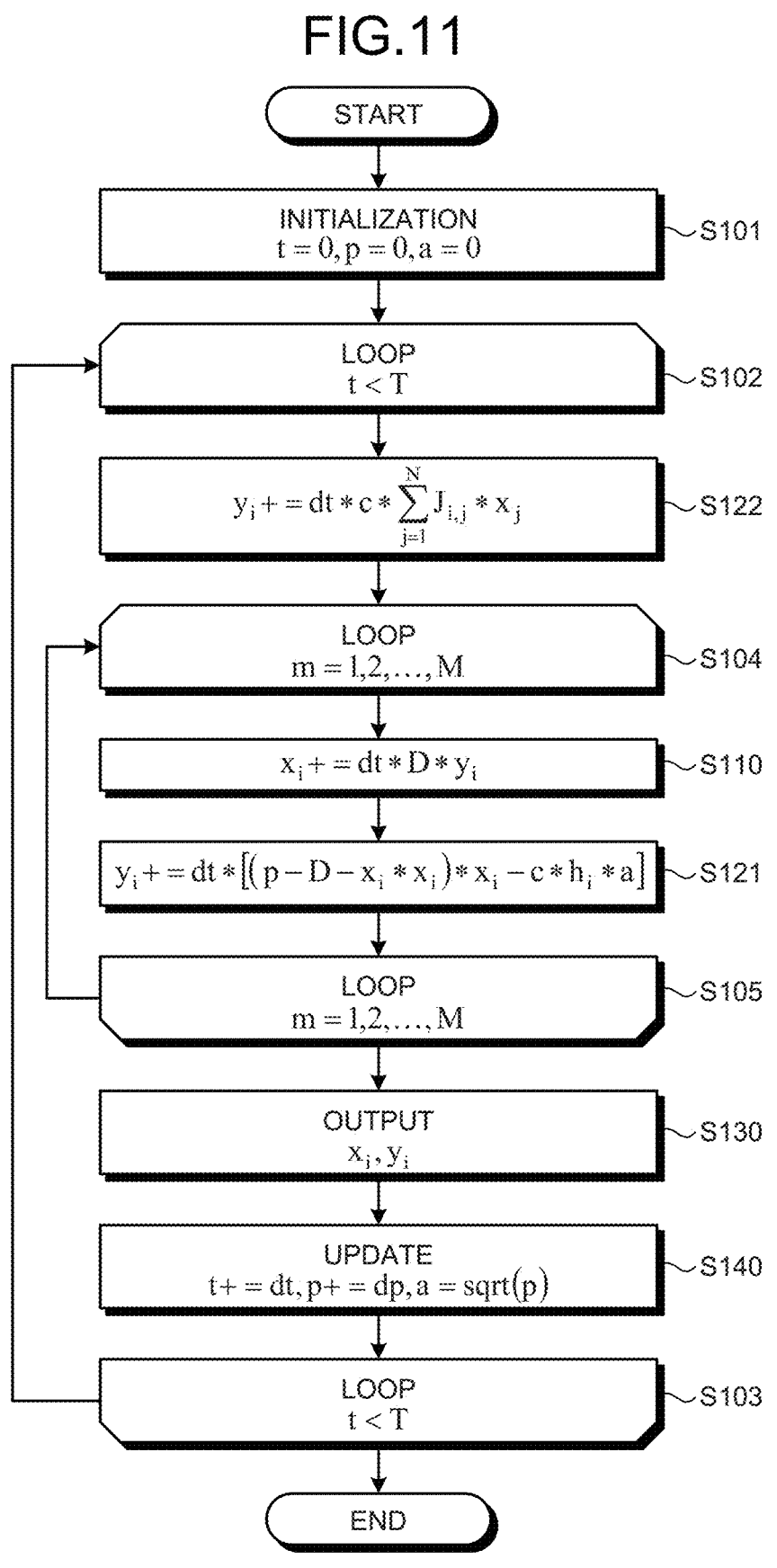

START

S101: INITIALIZATION $t=0, p=0, a=0$

S102: LOOP $t<T$

S122: $y_i += dt * c * \sum_{j=1}^{N} J_{i,j} * x_j$

S104: LOOP $m=1,2,\ldots,M$

S110: $x_i += dt * D * y_i$

S121: $y_i += dt * [(p - D - x_i * x_i) * x_i - c * h_i * a]$

S105: LOOP $m=1,2,\ldots,M$

S130: OUTPUT $x_i, y_i$

S140: UPDATE $t += dt, p += dp, a = sqrt(p)$

S103: LOOP $t<T$

END (a)

(b)

(c)

(a)

(b)

(c)

CALCULATION DEVICE, DISPLAY DEVICE, AND COMPUTER PROGRAM PRODUCT

CROSS-REFERENCE TO RELATED APPLICATIONS

This application is a continuation of PCT International Application No. PCT/JP2020/009498 filed on Mar. 5, 2020 which claims the benefit of priority from Japanese Patent Application No. 2019-050992, filed on Mar. 19, 2019, the entire contents of which are incorporated herein by reference.

FIELD

Embodiments described herein relate generally to a calculation device, a display device, and a computer program product.

BACKGROUND

Many of combinatorial optimization problems can be converted into problems (hereinafter, referred to as "Ising problems") to find a minimum energy state (ground state) of Ising models in statistical mechanics. In recent years, quantum computers (hereinafter, referred to as "Ising machines") for solving Ising problems fast have been actively developed. Unfortunately, the Ising machines currently proposed have their limits in the number of spins (the number of quantum bits) and have problems that solving large-scale Ising problems is difficult.

Simulated annealing is known as a method for solving the Ising problems by simulation with a computer. Simulated annealing can handle large-scale Ising problems, but is unsuitable for parallel computing because it employs a sequential update algorithm and is difficult to solve large-scale Ising problems fast.

An object of an embodiment is to provide a calculation device, a display device, and a computer program product, which are capable of solving large-scale Ising problems fast.

BRIEF DESCRIPTION OF THE DRAWINGS

FIG. 11 is a flowchart illustrating an exemplary process by the processing module;

DETAILED DESCRIPTION

According to an embodiment, a calculation device includes a memory and one or more processors coupled to the memory. The one or more processors are configured to: repeat a processing procedure including a first variable update and a second variable update; and display an image on a display device. The first variable update includes updating, for each of N (N is an integer equal to or greater than 2) first variables $x_i$ (i is an integer equal to or greater than 1 and equal to or smaller than N), a corresponding first variable $x_i$ by adding a value obtained by a first function to the corresponding first variable $x_i$ before updating. The second variable update includes updating, for each of N second variables $y_i$ corresponding to the N first variables $x_i$, a corresponding second variable $y_i$ by adding a value obtained by a second function and a value obtained by a third function to the corresponding second variable $y_i$ before updating. Variables of the first function include the second variable $y_i$, and variables of the second function include the first variable $x_i$. The third function includes a product-sum operation of a matrix $J_{i,j}$, and a first variable $x_j$ (j is an integer different from i and equal to or greater than 1 and equal to or smaller than N). The one or more processors are further configured to: while repeating the processing procedure, output values of the updated first variables $x_i$ and second variables $y_i$, and when repetition of the processing procedure is finished, output a sign of the first variable $x_i$ last updated; and display on the display device a monitoring image representing a temporal change in at least some of the first variables $x_i$ and the second variables $y_i$, based on the output values of the first variables $x_i$ and the second variables $y_i$.

Specific embodiments of a calculation device, a display device, and a computer program product to which the present disclosure is applied will be described in detail below with reference to the accompanying drawings. In the following description, like elements are denoted by like reference signs and an overlapping description is omitted as appropriate.

Figure 1:
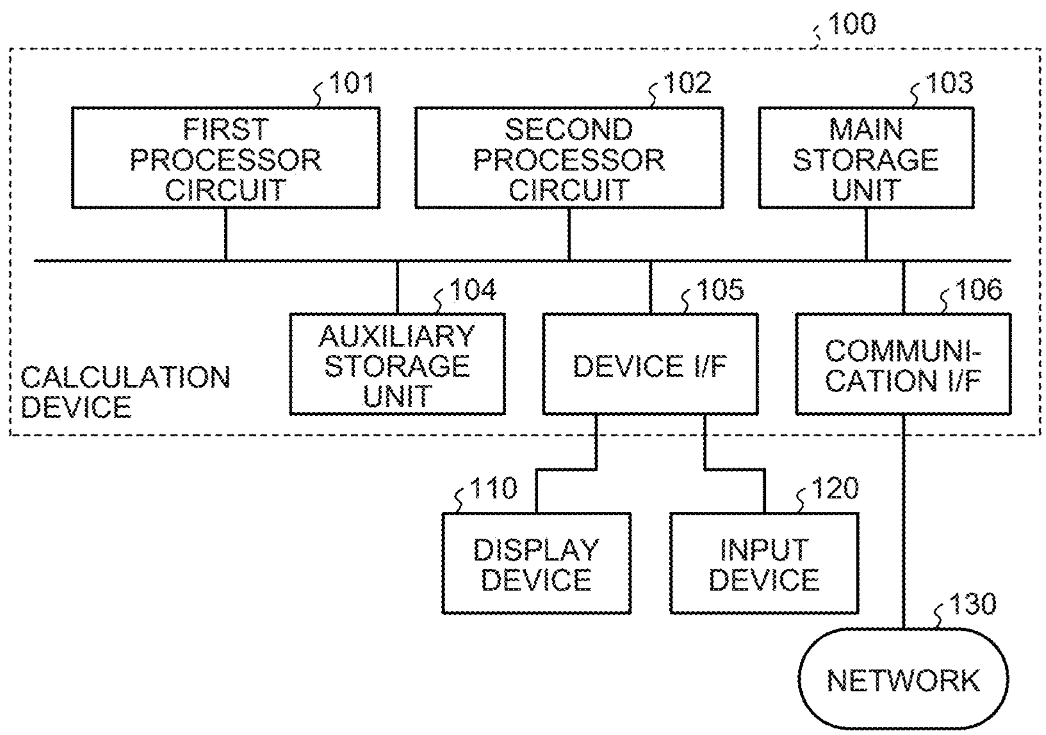
FIG. 1 is a block diagram illustrating a hardware configuration example of a calculation device according to an embodiment.

FIG. 1 is a block diagram illustrating a hardware configuration example of a calculation device 100 according to the present embodiment. As illustrated in FIG. 1, the calculation device 100 includes a first processor circuit 101, a second processor circuit 102, a main storage unit 103, an auxiliary storage unit 104, a device I/F 105, and a communication I/F 106.

The first processor circuit 101 includes, for example, a graphics processing unit (GPU). The first processor circuit 101 performs a specific process involving a large amount of calculation at high speed. In the present embodiment, the specific process is a process of solving the Ising problem (finding an approximate solution) by calculating the time evolution of new equations of motion described later.

The second processor circuit 102 includes, for example, a central processing unit (CPU). The second processor circuit 102 performs a relatively complex process, such as control for allowing the calculation device 100 to operate appropriately. In the present embodiment, for example, the setting of various parameters input by a user, the setting of variables, and display control of monitoring images described later are performed by the second processor circuit 102.

The main storage unit 103 includes, for example, a random access memory (RAM). The main storage unit 103 is a storage unit used by the first processor circuit 101 and the second processor circuit 102 as a working area.

The auxiliary storage unit 104 includes, for example, a mass storage unit such as a hard disk drive (HDD) or a solid state drive (SSD). The auxiliary storage unit 104 stores computer programs and data used in the calculation device 100. The computer programs and data stored in the auxiliary storage unit 104 are read by the first processor circuit 101 and the second processor circuit 102 and loaded into the main storage unit 103. The first processor circuit 101 and the second processor circuit 102 can perform the process described above, for example, under instructions of the computer program loaded into the main storage unit 103.

The device I/F 105 is an interface for connecting external devices such as a display device 110 (for example, a liquid crystal display) and an input device 120 (for example, a keyboard, mouse, a touch input panel, and a voice recognition input device) to the calculation device 100.

The communication I/F 106 is an interface for connecting the calculation device 100 to a network 130. The network 130 includes, for example, the Internet and a local area network (LAN).

For example, a general-purpose computer can be used as the calculation device 100 according to the present embodiment. The calculation device 100 may be configured with a plurality of computers connected to each other. For example, dedicated circuitry such as an application specific integrated circuit (ASIC) or a field-programmable gate array (FPGA) may be used for at least a part (for example, the first processor circuit 101) of the calculation device 100.

Figure 2:
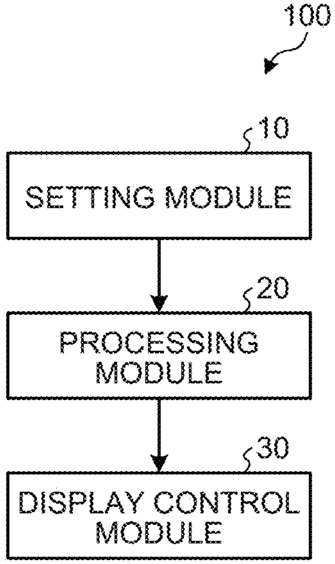
FIG. 2 is a diagram illustrating a functional configuration example of the calculation device according to the embodiment.

FIG. 2 is a block diagram illustrating a functional configuration example of the calculation device 100 according to the present embodiment. As illustrated in FIG. 2, the calculation device 100 includes, as functional configuration elements, a setting module 10, a processing module 20, and a display control module 30. The setting module 10 and the display control module 30 can be implemented by, for example, the second processor circuit 102. The processing module 20 can be implemented by, for example, the first processor circuit 101.

The setting module 10 performs, for example, the setting of various parameters for solving the new equations of motion described later and initialization of variables. The various parameters are set to values, for example, input by a user using the input device 120. The variables include N (N is an integer equal to or greater than 2) first variables $x_i$ (i is an integer equal to or greater than 1 and equal to or smaller than N) corresponding to the number of spins of the Ising model and N second variables $y_i$ corresponding to N first variable $x_i$. The first variable $x_i$ is a variable obtained by extending the range of Ising spins to a real number. The second variable $y_i$ is a variable whose range appearing in the new equations of motion described later is real numbers. A set of N first variables $x_i$ is called the first variable set $\{x\}$, and a set of N second variables $y_i$ is called the second variable set $\{y\}$. These first variable $x_i$ and second variable $y_i$ are initialized randomly, for example, by random numbers whose absolute values are equal to or smaller than 0.1, before starting calculation.

The processing module 20 repeats a processing procedure including a first variable update and a second variable update in order to calculate the time evolution of the new equations of motion described later. The first variable update includes updating, for each of N first variables $x_i$, the first variable $x_i$ by adding a value obtained by a first function to the first variable $x_i$ before updating. The second variable update includes updating, for each of N second variables $y_i$ the second variable $y_i$ by adding a value obtained by a second function and a value obtained by a third function to the second variable $y_i$ before updating. Variables of the first function include the second variable $y_i$, and variables of the second function include the first variable $x_i$. The third function includes a product-sum operation of a matrix $J_{i,j}$ and a first variable $x_1$ (j is an integer different from i and equal to or greater than 1 and equal to or smaller than N). The first function, the second function, and the third function are functions derived from the new equations of motion described later. Specific examples of these will be described in detail later.

While repeating the processing procedure above, the processing module 20 outputs the values of the updated first variables $x_i$ and second variables $y_i$. Then, when a predetermined end condition is satisfied and the repetition of the processing procedure above is finished, the processing module 20 outputs the sign "±1" of the last updated first variable $x_i$. When the time evolution of the new equations of motion described later is calculated appropriately, it is expected that the signs "±1" of the last updated N first variables $x_i$ represent the Ising spins of the ground state.

The display control module 30 displays a monitoring image representing a temporal change in at least some of the first variables $x_i$ and the second variables $y_i$ on the display device 110, based on the values of the first variable $x_i$ and the second variable $y_i$ output by the processing module 20. Specific examples of the monitoring image will be described in detail later.

When the Ising problem is solved by simulation with the calculation device 100 according to the present embodiment, it is ideal that as the time evolution of the new equations of motion described later proceeds with repetition of the processing procedure by the processing module 20, the values of N first variables $x_i$ bifurcate and converge from the vicinity of 0 to positive and negative certain values. When the setting of parameters is not appropriate, however, the values of N first variables $x_i$ may fail to bifurcate well or may diverge to infinity.

Then, in the present embodiment, the display control module 30 generates a monitoring image representing a temporal change in at least some of the first variables $x_i$ and the second variables $y_i$ (an image that visualizes a temporal change in the first variables $x_i$ and the second variables $y_i$ involved with the time evolution of the new equations of motion), based on the values of the first variable $x_i$ and the second variable $y_i$ output from the processing module 20 while the processing procedure is repeated. The display control module 30 then displays this monitoring image on the display device 110. The user thus can refer to the monitoring image appearing on the display device 110 to check whether bifurcation of the first variable $x_i$ is performed appropriately and check whether the setting of parameters is appropriate. When the bifurcation is not appropriate, the direction of tuning of parameters can be determined from the state of a temporal change in the first variables $x_i$ and the second variables $y_i$ represented by the monitoring image.

Figure 3:
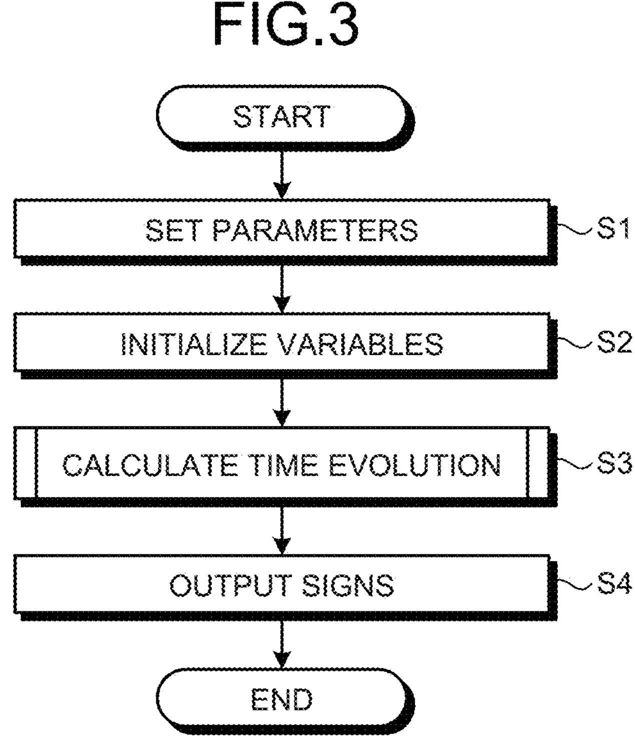
FIG. 3 is a flowchart illustrating an example of operation of the calculation device according to the embodiment.

The operation of the calculation device 100 according to the present embodiment will now be described. FIG. 3 is a flowchart illustrating an example of the operation of the calculation device 100.

When the operation of the calculation device 100 starts, first of all, the setting module 10 performs setting of various parameters for solving the new equations of motion described later (step S1). The parameters include, for example, "N" denoting the number of first variables $x_i$ or second variables $y_i$, and "T", "D", "K", "c", and "p" described later. The parameters further include a matrix "$J_{i,j}$" (first parameter) representing the intensity of interaction between elements. The parameters may further include a vector "$h_i$" (second parameter) representing an external field.

Subsequently, the setting module 10 initializes each of the first variables $x_i$ included in the first variable set {x} and each of the second variables $y_i$ included in the second variable set {y} randomly, for example, by random numbers whose absolute values are equal to or smaller than 0.1 (step S2).

Subsequently, the processing module 20 performs calculation of the time evolution of the new equations of motion described later (step S3). More specifically, the processing module 20 calculates the time evolution of the new equations of motion described later by repeating the processing procedure including the first variable update and the second variable update multiple times. In the first variable update, the first variable set {x} is updated using the second variable set {y}, and in the second variable update, the second variable set {y} is updated using the first variable set {x}. In at least some of multiple processing procedures, the second variable update may be performed after the first variable update, and the first variable update may be performed after the second variable update. The processing procedure including the first variable update and the second variable update may be repeated until a predetermined end condition is satisfied.

When the repetition of the processing procedure is finished, the processing module 20 outputs the sign of each of the first variables $x_i$ included in the last updated first variable set {x} (step S4). The signs of the first variables $x_i$ represent the Ising spins of the ground state. The calculation device 100 according to the present embodiment can solve a large-scale Ising problem fast by calculating the time evolution of the new equations of motion as described above.

The Ising problem handled by the calculation device 100 according to the present embodiment will now be described. The Ising energy is given, for example, by Equation (1) below.

$$E_{Ising} = -\frac{1}{2}\sum_{i=1}^{N}\sum_{j=1}^{N} J_{i,j}s_i s_j + \sum_{i=1}^{N} h_i s_i \tag{1}$$

In this Equation (1), "N" is the number of Ising spins (the number of spins). "$s_i$" is the $i^{th}$ Ising spin, for example, "$s_i$"=±1. "$J_{i,j}$" is a matrix (first parameter) representing the intensity of interaction between Ising spins, for example, a real symmetric matrix in which all of diagonal components (diagonal elements) are zero. "$h_i$" is a vector (second parameter) representing an external field.

For Equation (1) above, classical models of quantum bifurcation machines (hereinafter referred to as "classical bifurcation machines") have been proposed. For example, Japanese Patent Application Laid-open No. 2017-73106 describes an example of simulation by the classical bifurcation machine. In the classical bifurcation machine, the equations of motion are given by simultaneous ordinary differential equations in Equation (2) to Equation (4) below.

$$\frac{dx_i}{dt} = \frac{\partial H}{\partial y_i} = y_i\{D + p(t) + K(x_i^2 + y_i^2)\} - c\sum_{j=1}^{N} J_{i,j}y_j \tag{2}$$

$$\frac{dy_i}{dt} = \frac{\partial H}{\partial x_i} = x_i\{-D + p(t) - K(x_i^2 + y_i^2)\} - ch_i a(t) + c\sum_{j=1}^{N} J_{i,j}x_j \tag{3}$$

$$H = \sum_{i=1}^{N}\left[\frac{D}{2}(x_i^2 + y_i^2) - \frac{p(t)}{2}(x_i^2 - y_i^2) + \frac{K}{4}(x_i^2 + y_i^2)^2 + ch_i x_i a(t) - \frac{c}{2}\sum_{j=1}^{N} J_{i,j}(x_i x_j + y_i y_j)\right] \tag{4}$$

In these Equation (2) to Equation (4), "N" corresponds to, for example, the number of Ising spins (the number of spins). "D" is, for example, a parameter corresponding to "detuning" described in Japanese Patent Application Laid-open No. 2017-73106. "c" is a constant. "p" is a parameter, for example, corresponding to "pump amplification (pump rate)" described in Japanese Patent Application Laid-open No. 2017-73106. "K" is a parameter, for example, corresponding to "Kerr coefficient" described in Japanese Patent Application Laid-open No. 2017-73106. In the equations of motion given by Equation (2) to Equation (4) above, the second parameter "$h_i$" is not necessarily provided. In such a case, the term including "$h_i$" in Equation (3) and Equation (4) above is ignored.

In Equation (2) to Equation (4) above, the sign "±1" of the final value (the last updated value) of "$x_i$" obtained when p(t) is increased from zero to a sufficiently large value is the Ising spin "$s_i$" of the optimal solution (ground state). "a(t)" is a parameter increasing with p(t). "a(t)" is given, for example, by Equation (5) below.

$$a(t)=\sqrt{p(t)/K} \tag{5}$$

The classical bifurcation machine can be considered as a Hamiltonian dynamical system described by Equation (2) to Equation (4) above in which "H" is the Hamiltonian.

Simulated annealing is widely known as a method for solving the Ising problems by simulation with a computer. In this method, a sequential update algorithm is employed. In the sequential update algorithm, a plurality of spins are updated one by one. Such a sequential update algorithm is unsuitable for parallel computing.

By contrast, the equations of motion for the classical bifurcation machine can be solved by a discrete solution method with a digital computer. Unlike simulated annealing, this algorithm is a parallel update algorithm. In the parallel update algorithm, a plurality of variables can be updated simultaneously. Acceleration by parallel computing therefore can be expected.

The approach using Equation (2) to Equation (4) above seems to have the following problems. Specifically, the multiply-and-add calculation for the matrix $J_{i,j}$ with the largest amount of calculation is required both in updating of the first variables $x_i$ and in updating of the second variables $y_i$. Since the equations of motion above cannot be numerically solved easily, for example, a discrete solution method (for example, the Runge-Kutta method of order 4) is necessary. Therefore, it is feared that sufficient acceleration is not achieved even by introducing parallel computing.

Then, in the present embodiment, for example, the new equations of motion given by Equation (6) to Equation (8) below are solved, rather than the equations of motion given by Equation (2) to Equation (4) above.

$$\frac{dx_i}{dt} = \frac{\partial H'}{\partial y_i} = Dy_i \tag{6}$$

$$\frac{dy_i}{dt} = -\frac{\partial H'}{\partial x_i} = \{-D + p(t) - Kx_i^2\}x_i - ch_i a(t) + c\sum_{j=1}^{N} J_{i,j}x_j \tag{7}$$

$$H' = \sum_{i=1}^{N}\left[\frac{D}{2}(x_i^2 + y_i^2) - \frac{p(t)}{2}x_i^2 + \frac{K}{4}x_i^4 + ch_i x_i a(t) - \frac{c}{2}\sum_{j=1}^{N} J_{i,j}x_i x_j\right] \tag{8}$$

In these Equation (6) to Equation (8), "N" corresponds to, for example, the number of Ising spins (the number of spins). "D" is, for example, a parameter corresponding to "detuning" described in Japanese Patent Application Laid-open No. 2017-73106. "c" is a constant. "p" is a parameter (computation parameter), for example, corresponding to "pump amplification (pump rate)" described in Japanese Patent Application Laid-open No. 2017-73106. "K" is a parameter, for example, corresponding to "Kerr coefficient" described in Japanese Patent Application Laid-open No. 2017-73106. These parameters are set, for example, at step S1 in FIG. 3. In one example, "K" is set to 1. In the equations of motion given by Equation (6) to Equation (8) above, the second parameter "$h_i$" is not necessarily provided. In such a case, the terms including "$h_i$" in Equation (7) and Equation (8) above are ignored.

When the new equations of motion given by Equation (6) to Equation (8) above are used, the product-sum operation for matrix $J_{i,j}$ with the largest amount of calculation is performed only in updating the second variable $y_i$ and is not performed in updating the first variable $x_i$. The amount of calculation is thus reduced. In the new equations of motion, "p" is eliminated from the time derivative of the first variable $x_i$. In the new equations of motion, the time derivative of the first variable $x_i$ includes the second variable $y_i$ and does not include the first variable $x_i$. The time derivative of the second variable $y_i$ includes the first variable $x_i$ and does not include the second variable $y_i$. In the Hamiltonian, the first variable $x_i$ and the second variable $y_i$ are separated from each other. Therefore, stable discrete solution methods with a small amount of calculation can be applied. For example, a method called the symplectic Euler method can be applied.

It has been found that high performance (for example, high accuracy) can be maintained when the new equations of motion are used as an approach for solving the Ising problems. In the calculation device 100 according to the present embodiment, the new equations of motion in a Hamiltonian dynamical system (new classical bifurcation machine) having the separatable Hamiltonian are solved, for example, by the symplectic Euler method. The calculation device 100 according to the present embodiment is configured such that calculation of such a new algorithm is performed as fast as possible through parallel computing.

In the embodiment, at step S3 in FIG. 3, the processing module 20 repeats the processing procedure including the first variable update and the second variable update to calculate the time evolution of the new equations of motion and finds the ground state of the Ising model. For example, the sign "±1" of the final value of the first variable $x_i$ obtained when "p(t)" is increased from zero to a sufficient large value is the Ising spin $s_i$ of the ground state. The detail of the process at step S3 in FIG. 3 will be described below.

Figure 4:
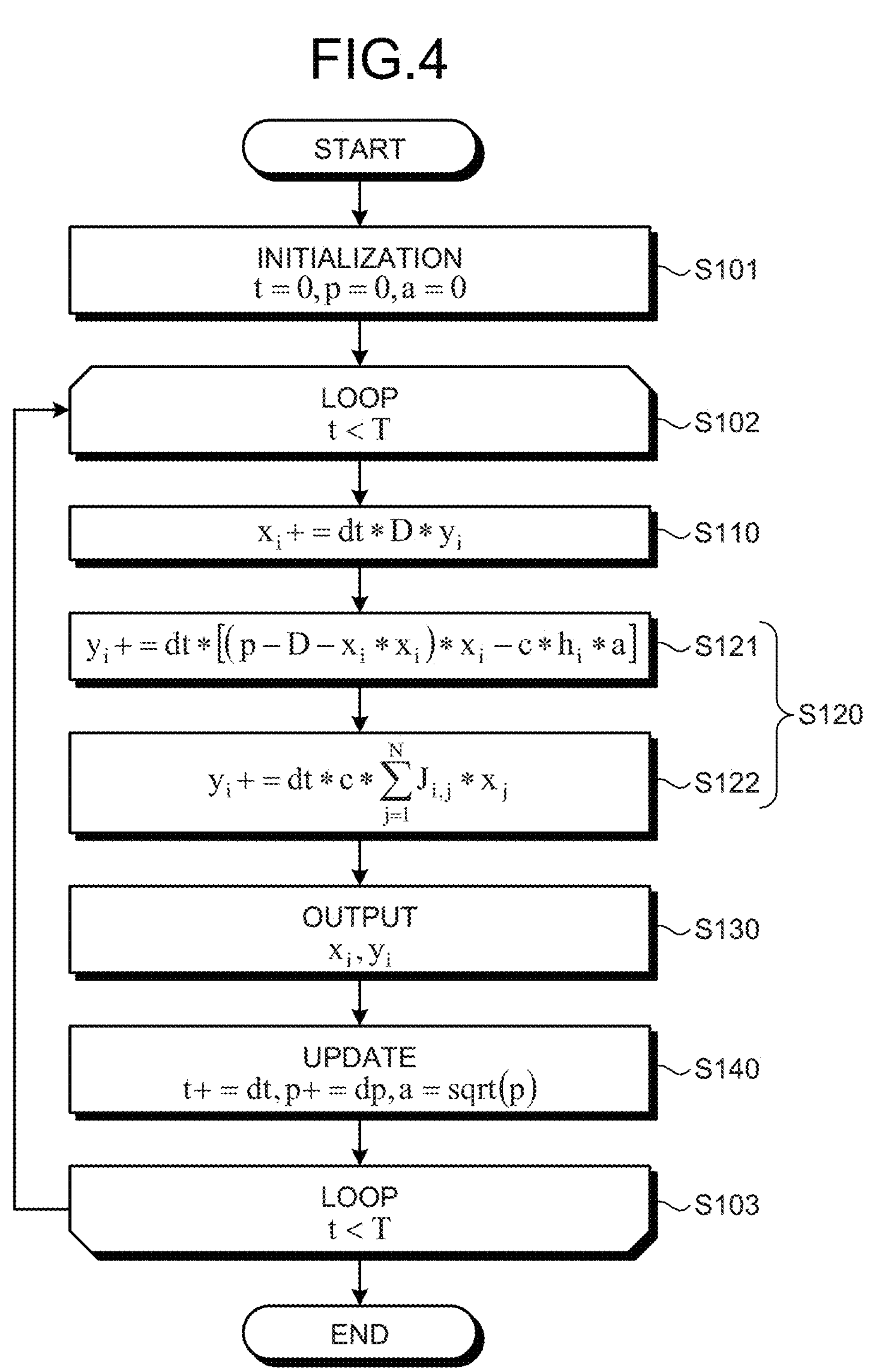
FIG. 4 is a flowchart illustrating an exemplary process by a processing module.

FIG. 4 is a flowchart illustrating an exemplary process by the processing module 20. The process illustrated in the flowchart in FIG. 4 is performed as a subroutine at step S3 in FIG. 3.

Upon start of this subroutine, the processing module 20 first initializes the time "t" and the computation parameters "p" and "a" (step S101). In one example, the time "t" and the computation parameters "p" and "a" are initialized to 0. "T" corresponds to the final value of the time "t". "dt" is the amount of increase per step of the time "t". "dp" is the amount of increase per step of the computation parameter "p". These "T", "dt", and "dp" are included in the parameters, for example, set at step S1 in FIG. 3.

When "t" is smaller than "T", the processing module 20 carries out the processing procedure including the first variable update and the second variable update described below (step S102). Specifically, the processing procedure including the first variable update and the second variable update is carried out as one step of the loop process repeated until the end condition that "t" is equal to or greater than "T" is satisfied. The end condition may be that "p" is equal to or greater than "P" set as appropriate in advance, and when "p" is smaller than "P", the processing procedure including the first variable update and the second variable update may be carried out.

In the processing procedure carried out as one step of the loop process, the processing module 20 first performs, for example, the first variable update (step S110). In the first variable update, N first variables $x_i$ corresponding to N Ising spins $s_i$ are updated. For example, a value obtained by adding dt*D*$y_i$ to the first variable $x_i$ before updating is set as the first variable $x_i$ after updating. Here, "*" is the symbol of product.

Subsequently, the processing module 20 performs the second variable update (step S120). In the second variable update, N second variables $y_i$ corresponding to N first variables $x_i$ are updated. The second variable update includes a first sub-update (step S121) and a second sub-update (step S122). The order of the first sub-update and the second sub-update is interchangeable. At least part of the first sub-update and at least part of the second sub-update may be performed simultaneously.

In the first sub-update, for example, a value obtained by adding dt*[(p-D-$x_i$*$x_i$)*$x_i$-c*$h_i$*a] to the second variable $y_i$ before updating is set as the second variable $y_i$ after updating.

In the second sub-update, for example, a value obtained by adding dt*c*Σ($J_{i,j}$*$x_j$) to the second variable $y_i$ before updating is set as the second variable $y_i$ after updating. "Σ" is the sum for the matrix J. For example, "dt*c*J" may be set as the matrix J. In this case, the computation of "dt*c*" need not be actually performed.

When the first variable update and the second variable update are finished, the processing module 20 outputs the values of the first variable $x_i$ and the second variable $y_i$ after updating (step S130). These values of the first variable $x_i$ and the second variable $y_i$ after updating are used for the display control module 30 to generate a monitoring image described later and display the monitoring image on the display device 110.

Subsequently, the processing module 20 updates the time "t" and the computation parameters "p" and "a" (step S140). For example, a value obtained by adding "dt" to "t" before updating is set as "t" after updating. Furthermore, a value obtained by adding "dp" to "p" before updating is set as "p" after updating. Furthermore, "$p^{1/2}$" is set as "a" after updating. In the present embodiment, in updating "p", linear increase using any given increasing function is applied.

Then, if "t" after updating is smaller than "T", the process returns to step S102, and the subsequent processing procedure is repeated (step S103). Subsequently, if "t" after updating is equal to or greater than "T", the loop process ends and the process proceeds to step S4 in FIG. 3. If "p" after updating is smaller than "P" set as appropriate in advance, the process may return to step S102, and if "p" after updating is equal to or greater than "P", the loop process may end and the process may proceed to step S4 in FIG. 3.

Figure 5:
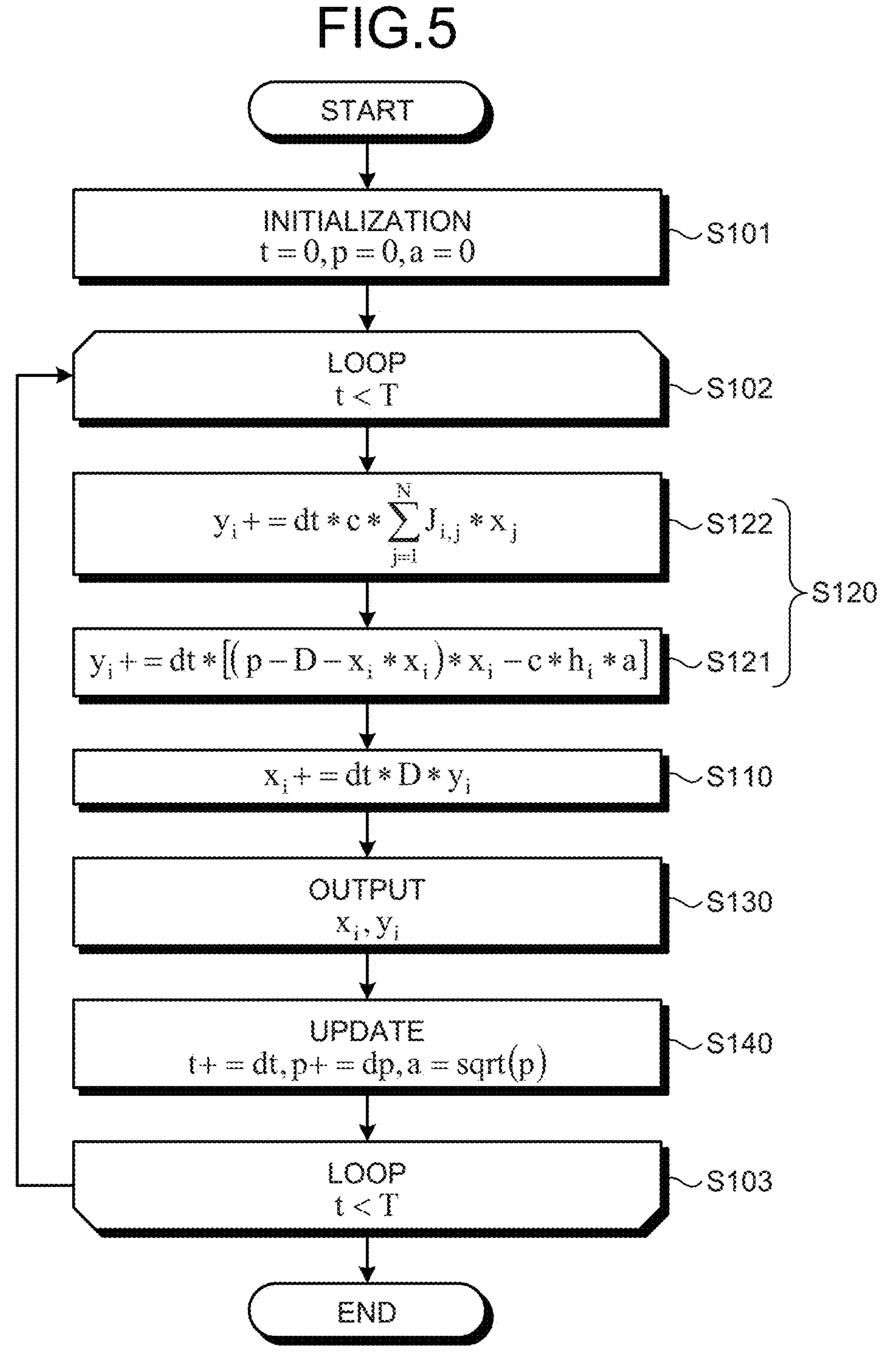
FIG. 5 is a flowchart illustrating an exemplary process by the processing module.

In the foregoing description, at each step in the loop process, the updating of the first variable $x_i$ and the second variable $y_i$ is performed in the order of the first variable update (step S110), the first sub-update (step S121) in the second variable update, and the second sub-update (step S122) in the second variable update. However, the order of these processes can be changed as appropriate. For example, as illustrated in FIG. 5, at at least some steps of the loop process, the updating of the first variable $x_i$ and the second variable $y_i$ may be performed in the order of the first sub-update (step S121) in the second variable update, the second sub-update (step S122) in the second variable update, and the first variable update (step S110).

Figure 6:
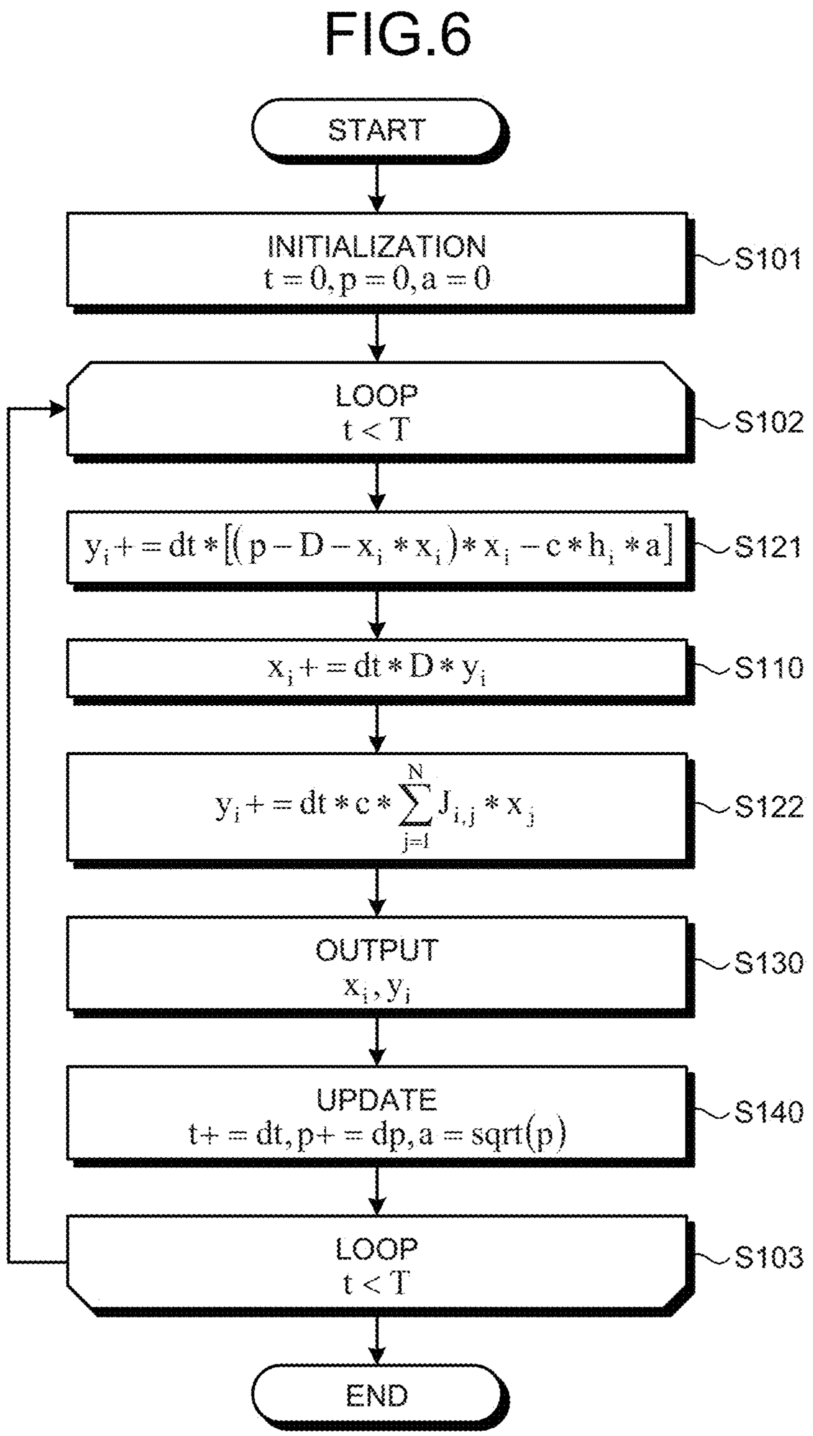
FIG. 6 is a flowchart illustrating an exemplary process by the processing module.
Figure 7:
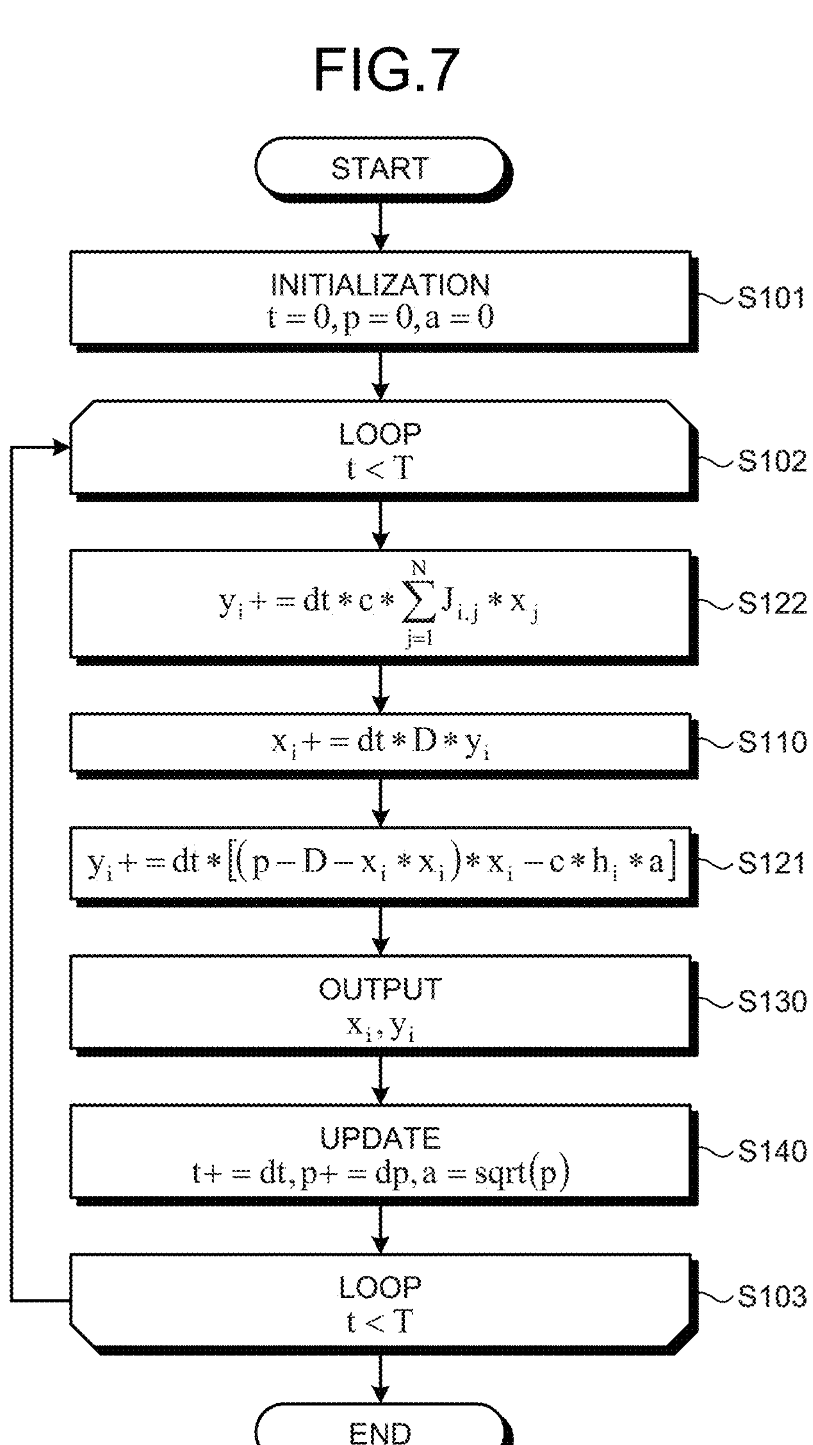
FIG. 7 is a flowchart illustrating an exemplary process by the processing module.

Furthermore, as illustrated in FIG. 6, at at least some steps in the loop process, the updating of the first variable $x_i$ and the second variable $y_i$ may be performed in the order of the first sub-update (step S121) in the second variable update, the first variable update (step S110), and the second sub-update (step S122) in the second variable update. Furthermore, as illustrated in FIG. 7, at at least some steps in the loop process, the updating of the first variable $x_i$ and the second variable $y_i$ may be performed in the order of the second sub-update (step S122) in the second variable update, the first variable update (step S110), and the first sub-update (step S121) in the second variable update.

The algorithm executed in the calculation device 100 according to the present embodiment includes, for example, the following. Specifically, the matrix $J_{i,j}$ is acquired or defined by calculation. Here, the vector $h_i$ may be additionally acquired or defined by calculation. The matrix $J_{i,j}$ and the vector $h_i$ are parameters in the Ising model. Two kinds of variables (the first variable set {x} and the second variable set {y}) are used. In updating of one of the variables, the value of the other variable is used. In updating of one variable, the value of the one variable is not used. After updating of one variable, the other is updated using the value of the one variable after updating.

More specifically, the updating of each of the first variables $x_i$ in the first variable set {x} (first variable update) includes updating the first variable $x_i$ by adding a value obtained by the first function to the first variable $x_i$ before updating. Furthermore, the updating of each of the second variables $y_i$ in the second variable set {y} (second variable update) includes updating the second variable $y_i$ by adding a value obtained by the second function and a value obtained by the third function to the second variable $y_i$ before updating. The first function is independent of the first variable set {x}. Even when the values of the first variable set {x} are changed, the value of the result of the first function does not change. The second function is independent of the second variable set {y}. Even when the values of the second variable set {y} are changed, the value of the result of the second function does not change. The third function is independent of the second variable set {y}. Even when the values of the second variable set {y} are changed, the value of the result of the third function does not change.

The first function is, for example, $dt*D*y_i$ (see FIG. 4). The second function is, for example, $dt*[(p-D-x_i*x_i)*x_i-c*h_i*a]$ (see FIG. 4). The third function is, for example, $dt*c*\Sigma(J_{i,j}*x_j)$ (see FIG. 4). Variables of the first function include the second variable $y_i$. Variables of the second function include the first variable $x^i$. The third function includes the product-sum operation $\Sigma(J_{i,j}*x_j)$ of the matrix Jif and the first variable $x_3$.

The second function includes, for example, a fourth function that is a nonlinear function of the first variable $x_i$. The fourth function also includes the computation parameter "p". "p" changes with updating of two kinds of variables. When "p" changes with updating of two kinds of variables, the number of real roots of the fourth function changes. The "real root of the function" is the value (real number) of the variable when the value of the function is zero. When only the fourth function is considered in the second variable update, the real roots of the fourth function correspond to the fixed points of a nonlinear dynamical system. (In a Hamiltonian dynamical system, the fixed points correspond to the extremes of the Hamiltonian.) Change in number of real roots of the fourth function therefore corresponds to change in number of fixed points. This corresponds to the bifurcation phenomenon in the nonlinear dynamical system.

In the algorithm used in the calculation device 100 according to the present embodiment, the initial values of the first variable $x_i$ and the second variable $y_i$ are set to the vicinity of initial one stable fixed point. Changing "p" causes bifurcation. A plurality of stable fixed points after bifurcation (the values of the variables change to the vicinity of one of the stable fixed points) are associated with discrete variables of a combinatorial optimization problem to be solved. The combinatorial optimization problem is thus solved by the bifurcation phenomenon. For example, in the example above, the value of each first variable $x_i$ at the stable fixed point after bifurcation is a positive/negative binary value, and its sign is associated with the Ising spin (the discrete variable of the Ising problem). Since the initial stable fixed point is the origin, the initial values of each first variable $x_i$ and each second variable $y_i$ are set to values in the vicinity of the origin (that is, random numbers whose absolute values are equal to or smaller than 0.1).

The fourth function is, for example, $dt*(p-D'-x_i*x_i)*x_i$. "D'" is an appropriate constant that satisfies $0 \leq D' \leq D$. At the initial time, p=0, and the fourth function has only one root $x_i=0$, but when p is greater than D', the fourth function has three roots, positive and negative two of which are associated with the Ising spins. The second function $dt*[(p-D-x_i*x_i)*x_i-c*h_i*a]$ can be given by the sum of the fourth function and the linear function, like $dt*(p-D'-x_i*x_i)*x_i+dt*[-(D-D')*x_i-c*h_i*a]$. Therefore, the second function includes the fourth function.

The fourth function above is, for example, a cubic function. With such a process, for example, the calculation becomes easier than calculation using nonlinear functions (for example, sigmoid function) used in neural networks.

In the calculation device 100 according to the present embodiment, increasing the time step (for example, "dt") accelerates the calculation. On the other hand, increasing the time step to excess leads to unstable calculation. In consideration of this, the time step in part of calculation may be increased, and the time step in another part of calculation may be reduced. For example, a large time step may be applied to the second sub-update (step S122) in the second variable update including the product-sum operation of the matrix $J_{i,j}$ and the first variable $x_j$ involving a large amount of calculation, whereas a small time step may be applied to the others, namely, the first variable update (step S110) and first sub-update (step S121) in the second variable update. This setting can achieve further acceleration.

Figure 8:
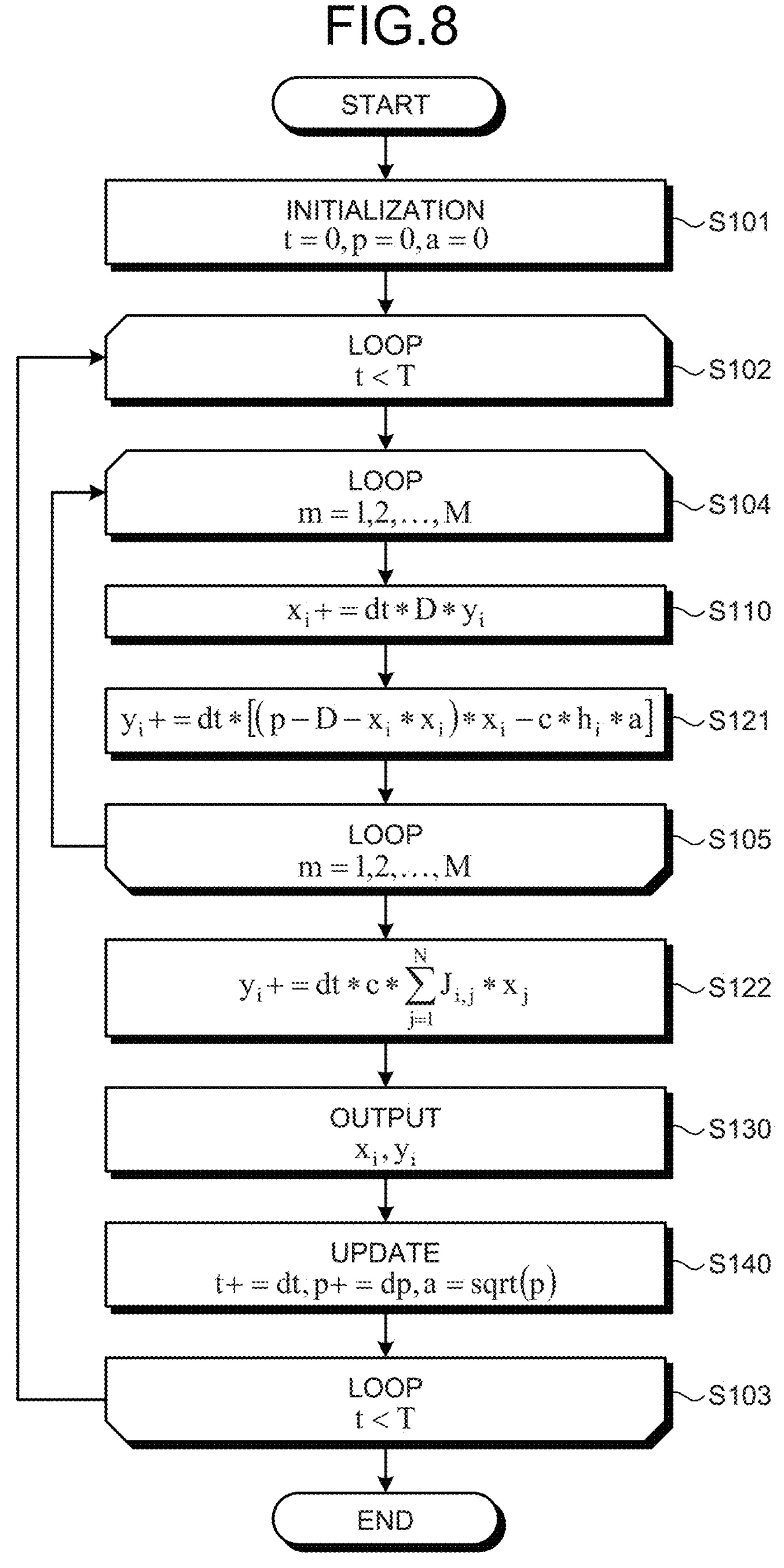
FIG. 8 is a flowchart illustrating an exemplary process by the processing module.

An example of the process by the processing module 20 in performing such calculation is illustrated in FIG. 8. In the example illustrated in FIG. 8, one loop (step S102 to step S103) includes a small loop (step S104 to step S105). At step S104, a loop variable "m" is equal to or greater than 1 and equal to or smaller than M. In the small loop, the first variable update (step S110) and the first sub-update (step S121) in the second variable update are repeated M times. After the first variable update (step S110) and the first sub-update (step S121) in the second variable update are repeated M times, the process proceeds to step S122 and the second sub-update of the second variable update is performed.

The order of the first variable update (step S110) and the first sub-update (step S121) in the second variable update in the small loop is interchangeable. An example in which the order of the first variable update (step S110) and the first sub-update (step S121) in the second variable update is changed is illustrated in FIG. 9.

Figure 9:
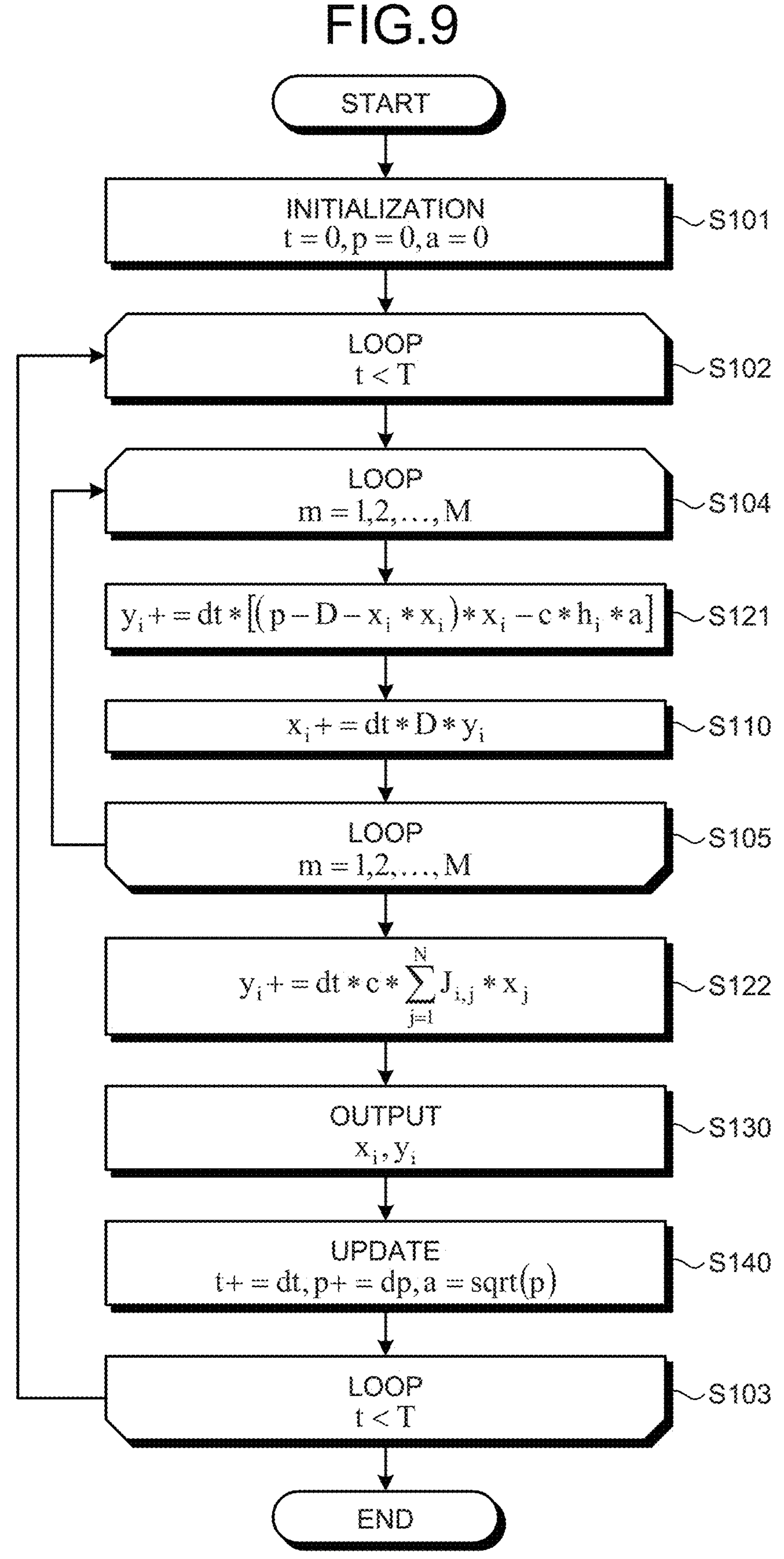
FIG. 9 is a flowchart illustrating an exemplary process by the processing module.
Figure 10:
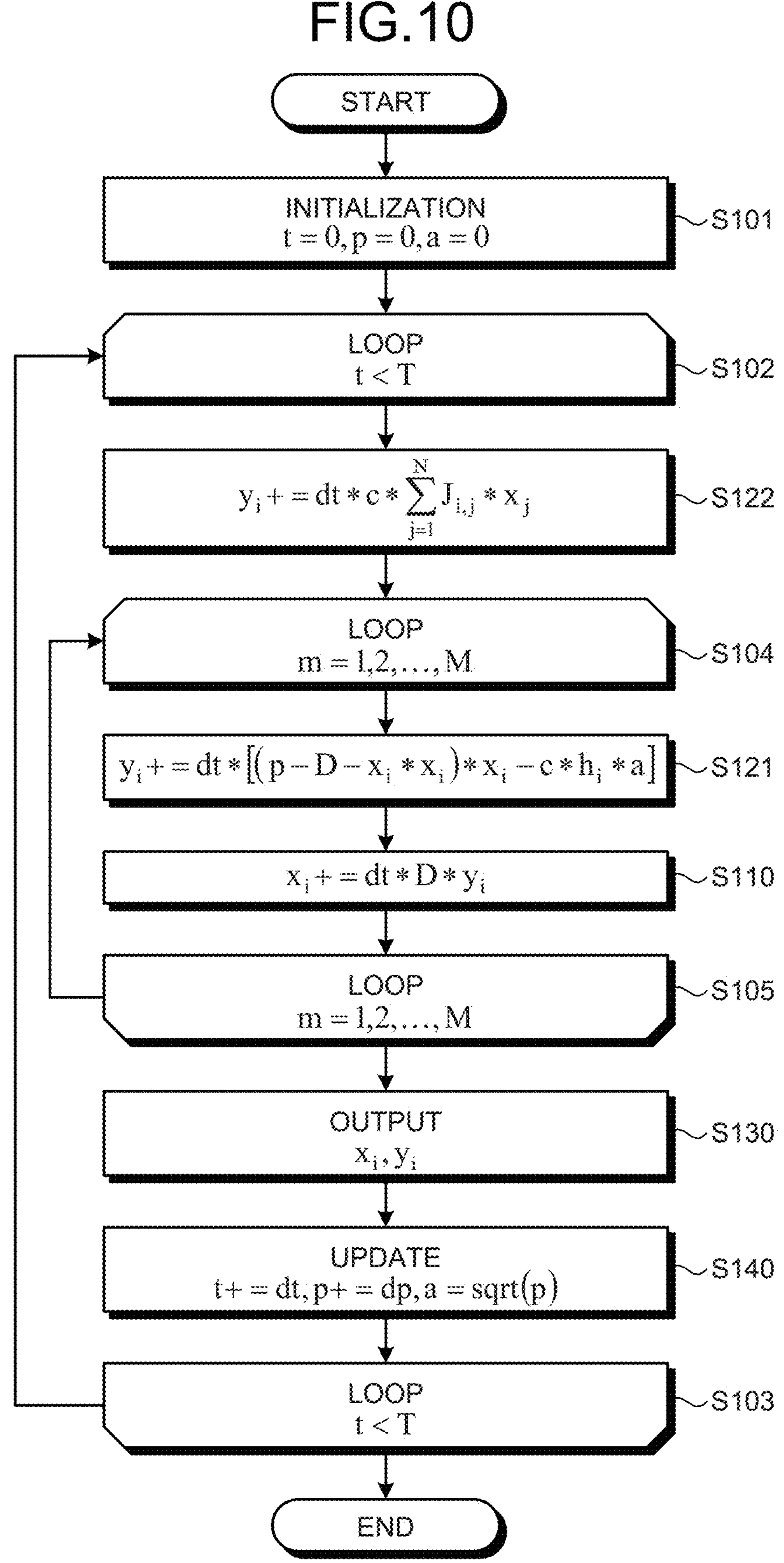
FIG. 10 is a flowchart illustrating an exemplary process by the processing module.

In the examples in FIG. 8 and FIG. 9, after the first variable update (step S110) and the first sub-update (step S121) in the second variable update are repeated M times, the second sub-update (step S122) in the second variable update is performed. However, as illustrated in FIG. 10 and FIG. 11, after the second sub-update (step S122) in the second variable update is performed, the first variable update (step S110) and the first sub-update (step S121) in the second variable update may be repeated M times.

In the calculation device 100 according to the present embodiment, the processing module 20 reads data retained in a memory such as the main storage unit 103, updates the data, and retains the updated data in the memory. For example, in the first variable update (step S110), the processing module 20 acquires the first variable $x_i$ before updating and the second variable $y_i$ from the memory, calculates the first function using the second variable $y_i$, updates the first variable $x_i$ by adding the obtained value to the first variable $x_i$ before updating, and retains the updated first variable $x_i$ in the memory.

Furthermore, in the first sub-update (step S121) in the second variable update, the processing module 20 acquires the second variable $y_i$ before updating and the first variable $x_i$ from the memory, calculates the second function using the first variable $x_i$ and updates the second variable $y_i$ by adding the obtained value to the second variable $y_i$ before updating, and retains the updated second variable $y_i$ in the memory. Furthermore, in the second sub-update (step S122) in the second variable update, the processing module 20 acquires the second variable $y_i$ before updating, the matrix and the first variable $x_i$ from the memory, calculates the third function using the matrix $J_{i,j}$ and the first variable $x_j$, updates the second variable $y_i$ by adding the obtained value to the second variable $y_i$ before updating, and retains the updated second variable $y_i$ in the memory.

In the embodiment, for example, when the matrix $J_{i,j}$ is a sparse matrix, a compressed sparse matrix may be used. For example, coordinate list (COO) or compressed sparse row (CSR) may be employed as the compressed sparse matrix. For example, the use of the compressed sparse matrix can save the memory size. For example, the use of the compressed sparse matrix can accelerate the product-sum operation of the matrix $J_{i,j}$ and the first variable $x_3$.

An example of the constant "c" will be described below. For example, the detuning "D" is set to be greater than c times the maximum eigenvalue λmax of the matrix $J_{i,j}$ (for example, see H. Goto, Sci. Rep. 6, 21686 (2016)). If "D" is too large, an unnecessary calculation time occurs. Therefore, for example, "D" is set to be substantially equal to c times λmax. In this case, c=D/λmax. On the other hand, in one example, the matrix $J_{i,j}$ is a real symmetric matrix. In this case, when the size of the matrix $J_{i,j}$ is sufficiently large, λmax is substantially equal to 2σ×N1/2. This relation is based on the Wigner semicircle law for random matrices. "σ" is a standard deviation of an off-diagonal component of the matrix J. In this case, c=D/(2σ×N1/2) can be set.

In the present embodiment, one possible method to increase the accuracy is to change the function used as a nonlinear function in Equation (7) above. For example, Equation (9) below may be used instead of Equation (7) above.

$$\frac{dy_i}{dt} = \{[-D + p(t)](1 + x_i^n) - Kx_i^{n+2}\}x_i - ch_i a(t) + c\sum_{j=1}^{N} J_{i,j}x_j \tag{9}$$

In this Equation (9), "n" is an even number equal to or greater than 2. For example, using such a function can increase the accuracy of a solution to the Ising problem.

The display control of the monitoring image by the calculation device 100 according to the present embodiment will now be described. The monitoring image is an image that visualizes a temporal change in the first variables $x_i$ and the second variables $y_i$ while the processing module 20 repeats the processing procedure for calculating the time evolution of the new equations of motion described above. The monitoring image is generated by the display control module 30, based on the values of the first variable $x_i$ and the second variable $y_i$ output by the processing module 20 in each step in the loop process described above, and is displayed on the display device 110.

For example, the display control module 30 accumulates the value of the first variable $x_i$ and the second variable $y_i$ output by the processing module 20 in each step in the loop process, for a predetermined number of steps m. Then, the coordinate points ($x_i$, $y_i$) represented by the accumulated values of the first variable $x_i$ and the second variable $y_i$ in the steps are plotted on two-dimensional coordinates to generate a monitoring image, and the monitoring image is displayed on the display device 110. In doing so, it is preferable that the coordinate points ($x_i$, $y_i$) on the monitoring image are color-coded in N colors according to the value of i.

In this monitoring image, the positional change in each step of the coordinate point ($x_i$, $y_i$) on two-dimensional coordinates can be represented as a locus, and the temporal change in the first variables $x_i$ and the second variables $y_i$ involved with the time evolution of the new equations of motion described above can be displayed in a way visually easy to understand. Here, even without color-coding, for each i, m points accumulated in the past may be displayed, and a set of m points is drawn in the form of a locus, or these m points may be successively connected with a line and represented as a locus. During display of the monitoring image, the values of the first variable $x_i$ and the Second variable $y_i$ newly output by the processing module 20 are accumulated as needed, and when the values for a predetermined number of steps are accumulated, a new monitoring image is generated to update the monitoring image appearing on the display device 110. The number of steps that are units of updating of the monitoring image can be set such that a state in which the first variable $x_i$ has not yet bifurcated at the beginning of time evolution of the new equations of motion and a state in which the first variable $x_i$ bifurcates with the progress of the time evolution of the new equations of motion are not mixed.

Figure 12:
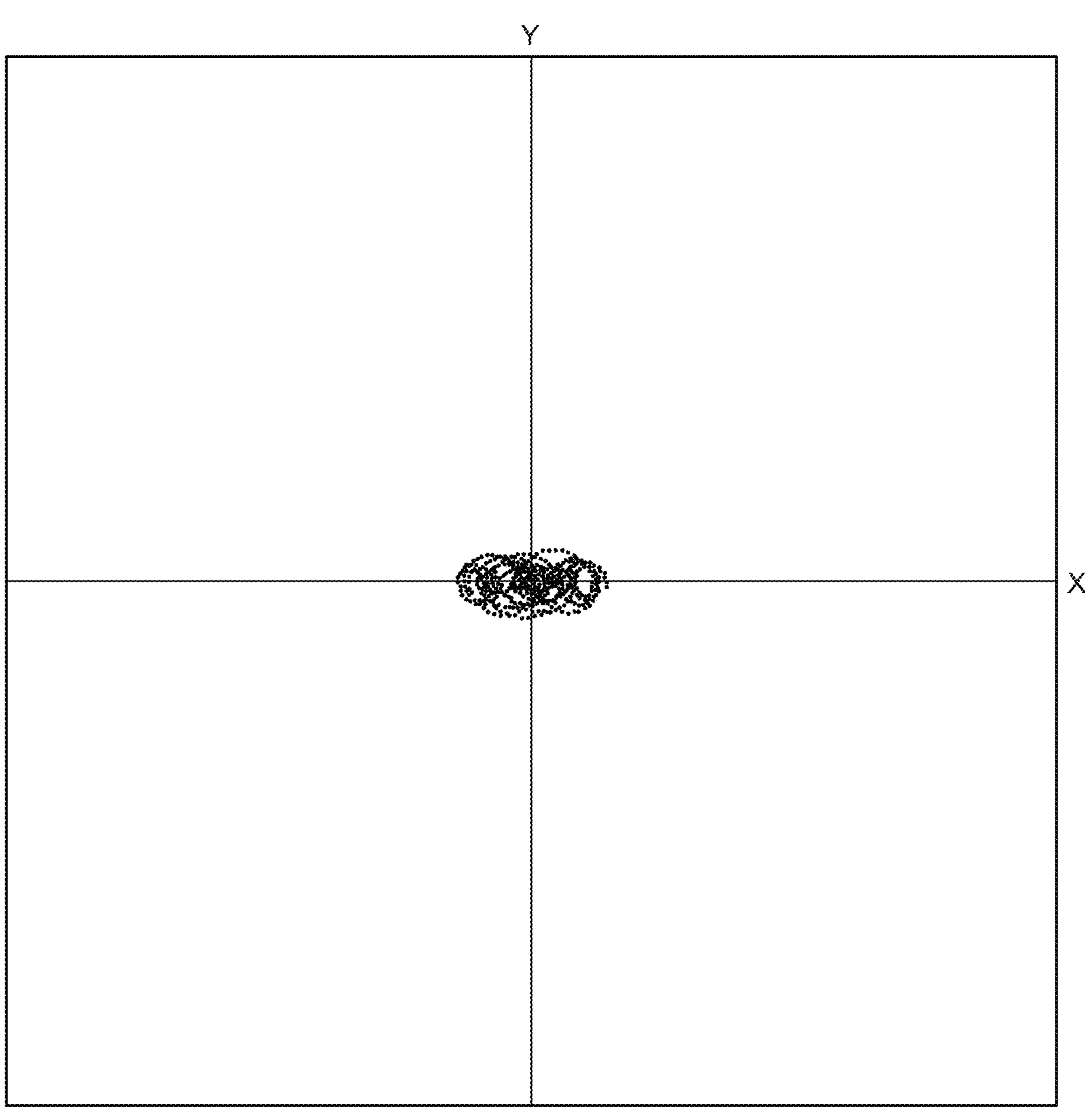
FIG. 12 is a diagram illustrating an exemplary monitoring image.
Figure 13:
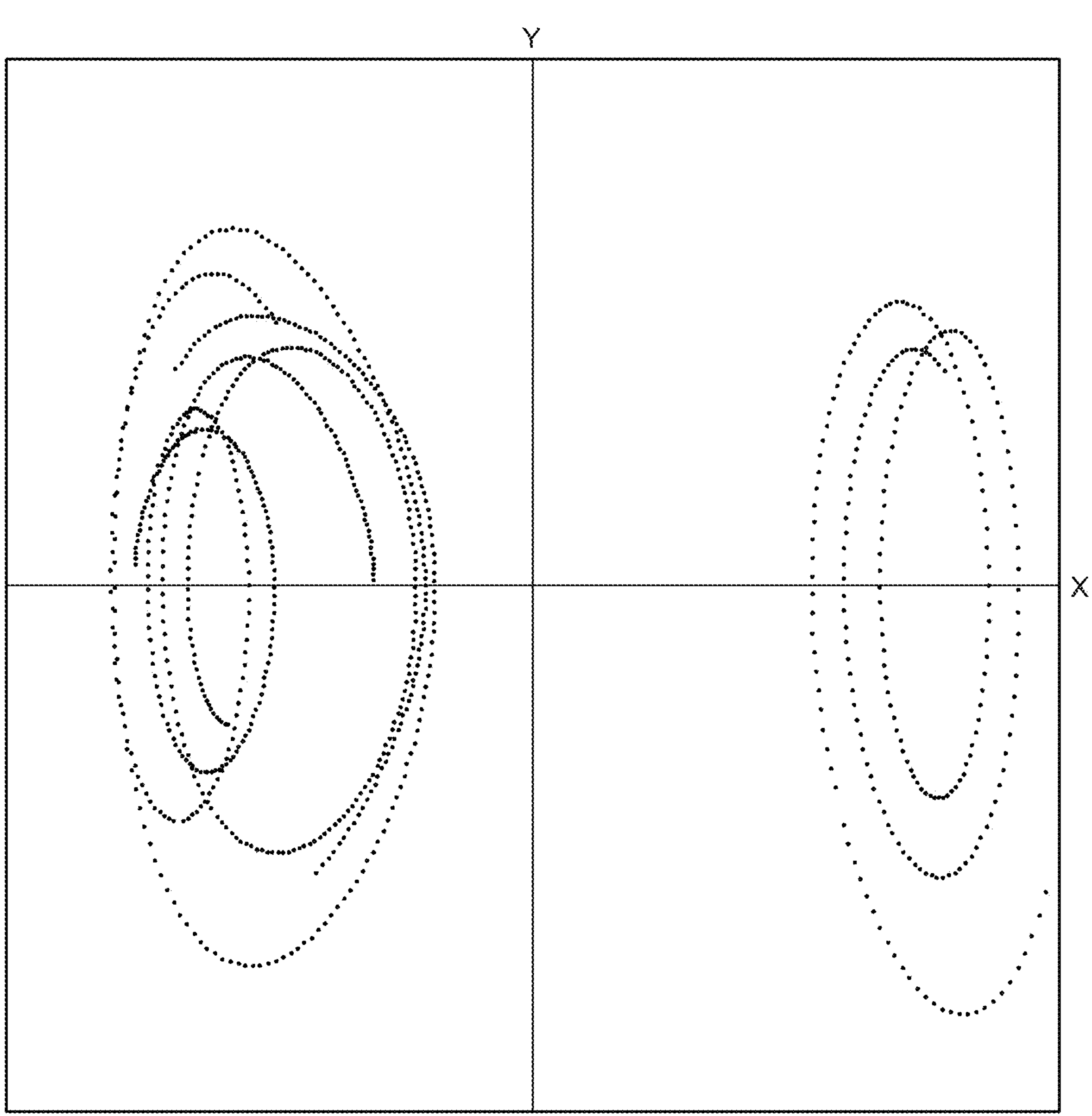
FIG. 13 is a diagram illustrating an exemplary monitoring image.
Figure 14:
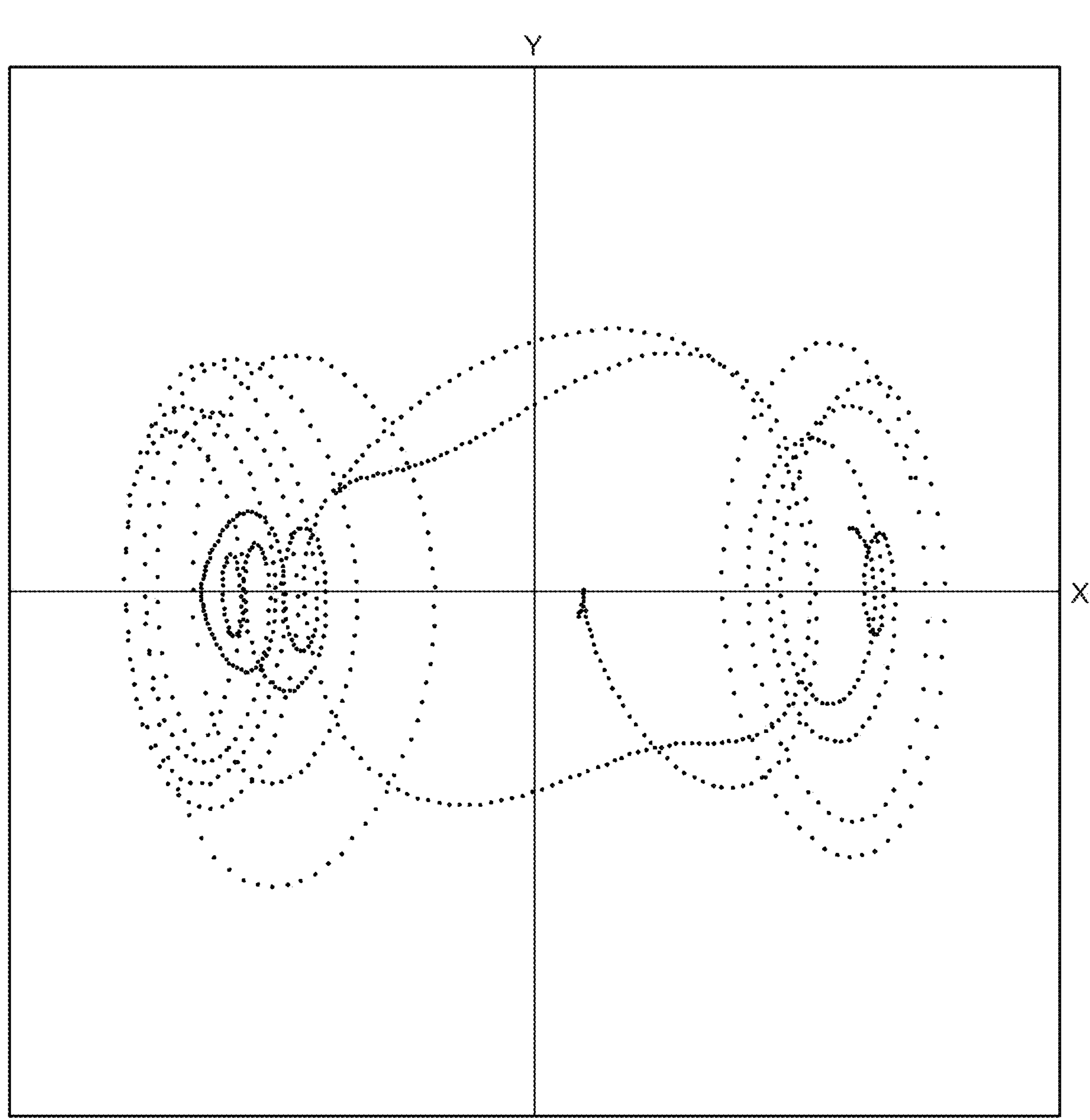
FIG. 14 is a diagram illustrating an exemplary monitoring image.

FIG. 12 to FIG. 14 are diagrams illustrating examples of the monitoring image, each illustrating a monitoring image in which four coordinate points $(x_i, y_i)$ where i=1 to 4 are plotted in each step on two-dimensional coordinates. The monitoring image illustrated in FIG. 12 corresponds to the initial state of the time evolution of the new equations of motion, and the loci of four coordinate points $(x_i, y_i)$ are concentrated on the vicinity of the origin of (0, 0) of the two-dimensional coordinates, which suggests that the first variables $x_i$ have not yet bifurcated.

The monitoring image illustrated in FIG. 13 is an example of the monitoring image updated from the monitoring image illustrated in FIG. 12 as the time evolution of the new equations of motion described above proceeds. In this example in FIG. 13, all of the loci of four coordinate points $(x_i\ y_i)$ are in the vicinity of a certain value on the positive side or the negative side of the X axis of the two-dimensional coordinates, which suggests that the values of four first variables $x_i$ bifurcate well as the time evolution of the new equations of motion proceeds. The user therefore can refer to this monitoring image to confirm that the setting of parameters is appropriate.

The monitoring image illustrated in FIG. 14 is another example of the monitoring image updated from the monitoring image illustrated in FIG. 12 as the time evolution of the new equations of motion described above proceeds. In this example in FIG. 14, one of the loci of four coordinate points $(x_i, y_i)$ extends from the positive side to the negative side of the X axis of the two-dimensional coordinates, which suggests that the values of the first variable $x_i$ fail to bifurcate well. The user therefore can view this monitoring image to confirm that the setting of parameters is not appropriate.

In the examples described above, it is assumed that the monitoring image is displayed as a still image on the display device 110, and the monitoring image is updated every time the values of the first variable $x_i$ and the second variable $y_i$ for a predetermined number of steps are accumulated. However, the embodiment is not limited thereto. For example, every time the processing module 20 outputs the values of the first variable $x_i$ and the second variable $y_i$, the coordinate point $(x_i\ y_i)$ may be plotted on the two-dimensional coordinates, and a monitoring image presenting the locus of the coordinate points $(x_i, y_i)$ as animation may be displayed on the display device 110. In this case, it is preferable that an upper limit is set for the number of coordinate points $(x_i, y_i)$ forming a locus, and when the number of coordinate points $(x_i, y_i)$ forming a locus reaches the upper limit, the earliest coordinate point $(x_i, y_i)$ at the time of addition of a new coordinate point $(x_i, y_i)$ is eliminated, thereby making the locus of coordinate points $(x_i\ y_i)$ more visible.

In the example described above, while the processing module 20 repeats the processing procedure above (loop process), the display control module 30 generates a monitoring image and displays the monitoring image on the display device 110. However, the embodiment is not limited thereto. For example, while the processing module 20 repeats the processing procedure, the display control module 30 may accumulate the values of the first variable $x_i$ and the second variable $y_i$ output in each step, and after the repetition of the processing procedure is finished, the display control module 30 may display a monitoring image presenting the locus of the coordinate point $(x_i, y_i)$ as described above as a still image or animation on the display device 110, based on the accumulated values of the first variable $x_i$ and the second variable $y_i$.

In the monitoring image representing a temporal change in the first variables $x_i$ and the second variables $y_i$ as the locus of the coordinate point $(x_i, y_i)$ as described above, when the value of "N", that is, the number of spins is large, many loci are overlapped, resulting in poor visibility. Then, the display control module 30 may generate a monitoring image representing a temporal change in the first variables $x_i$ and second variables $y_i$ in gray levels and display the generated monitoring image on the display device 110.

Figure 15:
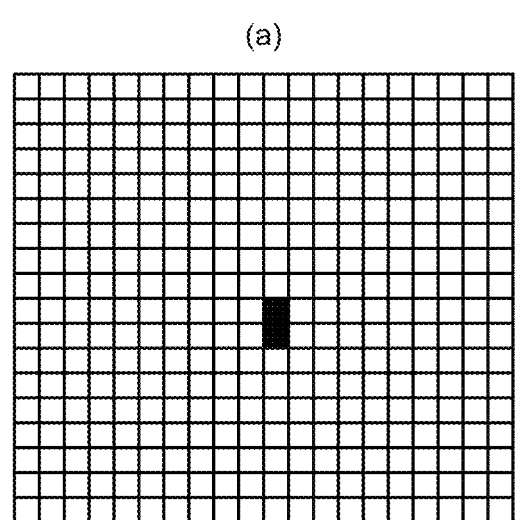
FIG. 15 is a diagram illustrating an exemplary monitoring image.
Figure 15:
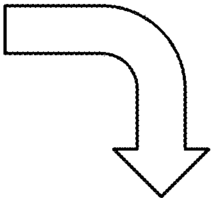
Figure 15:
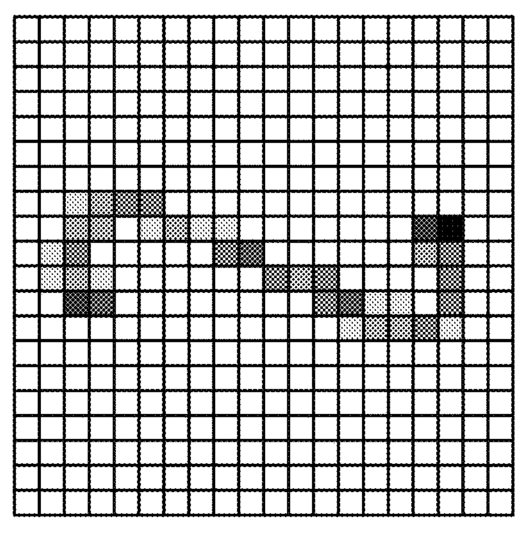
Figure 15:
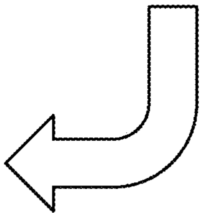
Figure 15:
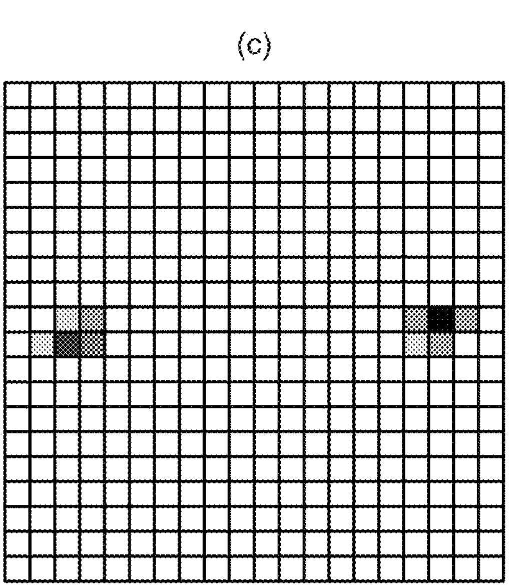
Figure 16:
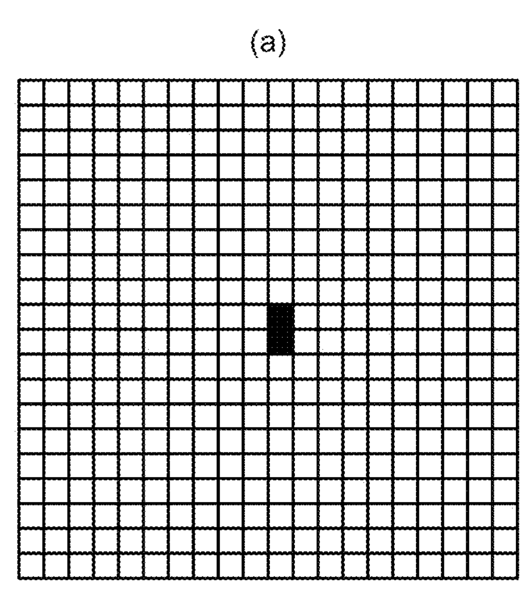
FIG. 16 is a diagram illustrating an exemplary monitoring image.
Figure 16:
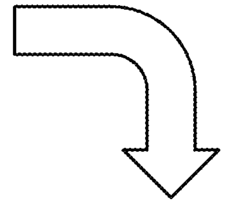
Figure 16:
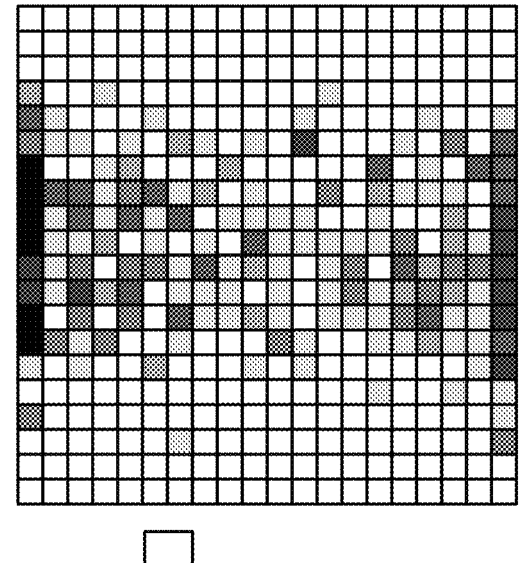
Figure 16:
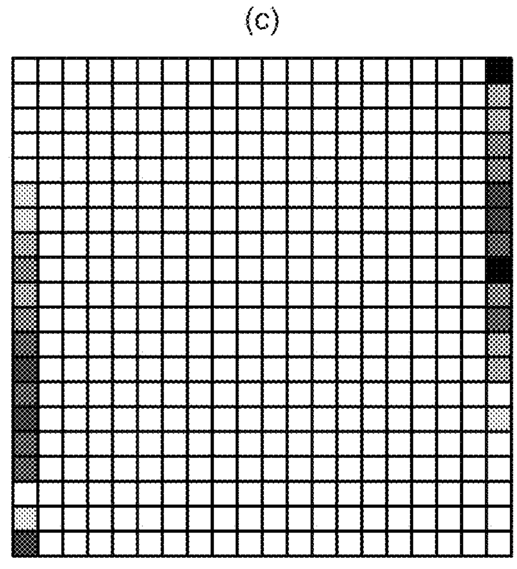
Figure 16:
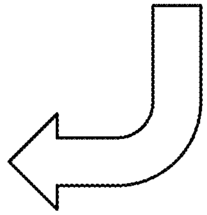

For example, the display control module 30 plots (arranges) the coordinate point $(x_i, y_i)$ represented by the values of the first variable $x_i$ and the second variable $y_i$ output by the processing module 20 in each step in the loop process above on two-dimensional coordinates divided into a plurality of small blocks. Then, for example, as illustrated in FIG. 15 and FIG. 16, a monitoring image representing each small block in a gray level according to the number of plots in the block is generated and displayed on the display device 110. Since the first variable $x_i$ and the second variable $y_i$ are real values, the position of the coordinate point $(x_i, y_i)$ may fall outside the range of two-dimensional coordinates displayed as the monitoring image. In this case, the coordinate point $(x_i, y_i)$ falling outside the range of two-dimensional coordinates can be plotted, for example, on a small block located on an edge in the X-axis direction.

The monitoring images illustrated in FIG. 15 and FIG. 16 are an example where the value of "N" (the number of spins) is 1000, in which (a) corresponds to the initial state of the time evolution of the new equations of motion, (b) corresponds to a state in which the time evolution proceeds to some degree, and (c) corresponds to a state in which the time evolution further proceeds.

In the monitoring image illustrated in FIG. 15, as the time evolution of the new equations of motion proceeds, the gray levels of small blocks in the vicinity of certain values on the positive side and the negative side of the X axis in two-dimensional coordinates become high, which suggests that the values of the first variable $x_i$ bifurcate well. The user therefore can refer to this monitoring image to confirm that the setting of parameters is appropriate.

On the other hand, in the monitoring image illustrated in FIG. 16, as the time evolution of the new equations of motion proceeds, the gray levels of small blocks at both ends of the X axis in two-dimensional coordinates become high, which suggests that the values of the first variable $x_i$ diverge. The user therefore can view this monitoring image to confirm that the setting of parameters is not appropriate, and in addition, can determine that the direction of tuning of parameters, for example, determine that the time step "dt" need to be reduced such that the values of the first variable $x_i$ do not diverge.

In the example described above, the coordinate point ($x_i$, $y_i$) represented by the values of the first variable $x_i$ and second variable $y_i$ output by the processing module 20 is plotted on two-dimensional coordinates to generate a monitoring image. However, the embodiment is not limited thereto. The monitoring image may be any image that represents a temporal change in the first variables $x_i$ and the second variables $y_i$ while the processing module 20 repeats the processing procedure for calculating the time evolution of the new equations of motion, and may be an image in a form different from the foregoing examples.

Figure 17:
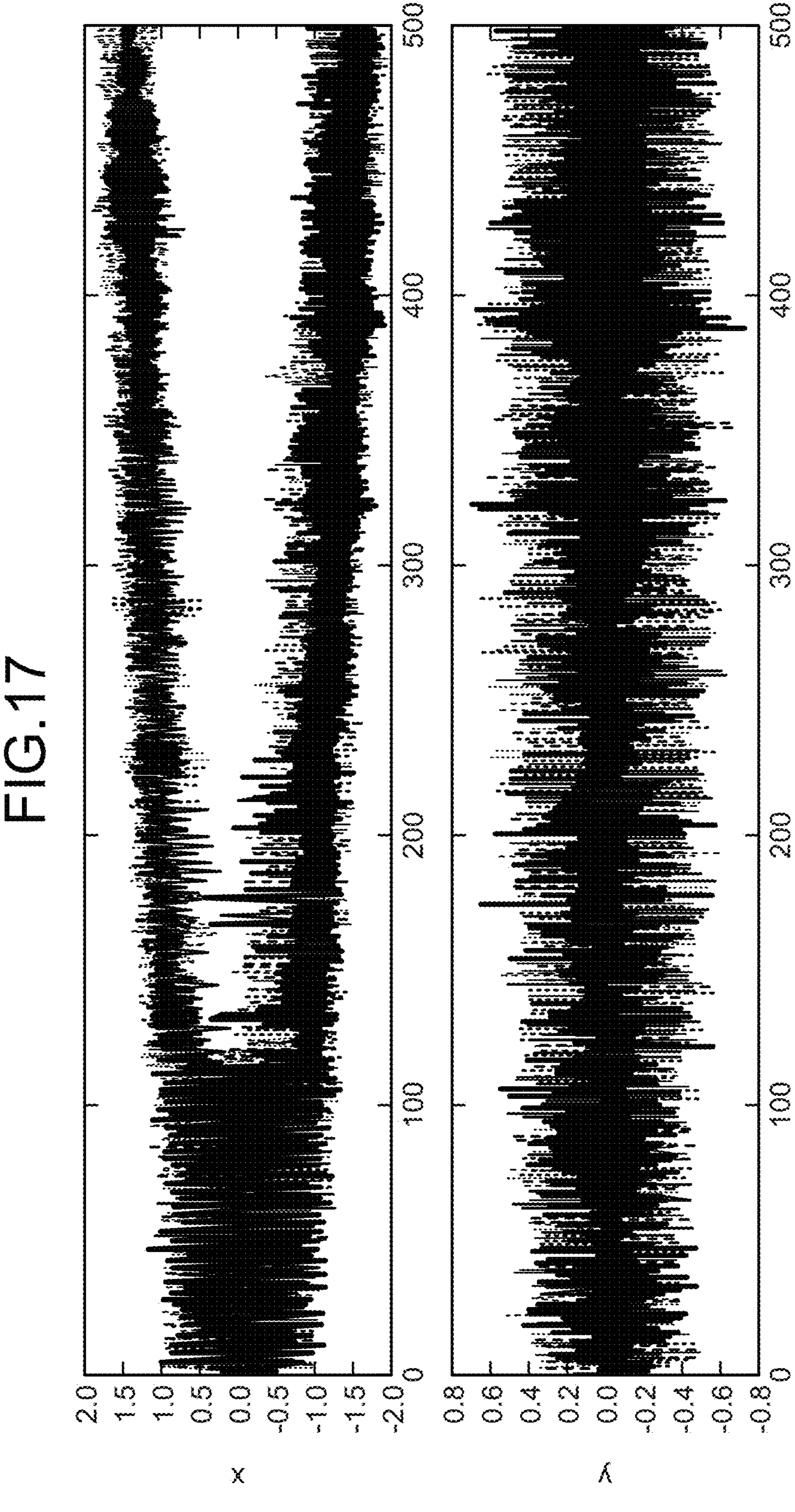
FIG. 17 is a diagram illustrating an exemplary monitoring image.

For example, as illustrated in FIG. 17, the display control module 30 may display, on the display device 110, a monitoring image including at least one of a first graph (the upper graph in FIG. 17) representing temporal change (one of the axes denotes time) of at least some of the values of the first variable $x_i$ output by the processing module 20 and a second graph (the lower graph in FIG. 17) representing temporal change (one of the axes denotes time) of at least some of the values of the second variable $y_i$ output by the processing module 20. In two graphs illustrated in FIG. 17, the horizontal axis is the time axis, the vertical axis in the first graph denotes the values of the first variable $x_i$, and the vertical axis in the second graph denotes the values of the second variable $y_i$. In the example illustrated in FIG. 17, it is understood that the values of the first variable $x_i$ converge to the vicinity of certain values on the positive side and the negative side with passage of time. The user therefore can refer to this monitoring image to confirm that the setting of parameters is appropriate.

As described in detail above with specific examples, the calculation device 100 according to the present embodiment is configured to solve the Ising problem by calculating the time evolution of the new equations of motion. The new equations of motion can be solved faster by parallel computing by applying a discrete solution method stable and involving a small amount of calculation, such as the symplectic Euler method. The calculation device 100 according to the present embodiment therefore can solve a large-scale Ising problem fast.

Furthermore, the calculation device 100 according to the present embodiment displays, on the display device 110, a monitoring image representing a temporal change in the first variables $x_i$ and the second variables $y_i$ while the time evolution of the new equations of motion is calculated. The user thus can refer to the monitoring image appearing on the display device 110 to check whether bifurcation of the first variable $x_i$ is performed appropriately and check whether the setting of parameters is appropriate. When the bifurcation is not appropriate, the direction of tuning of parameters can be determined from the state of a temporal change in the first variables $x_i$ and the second variables $y_i$ represented by the monitoring image.

The functional units (the setting module 10, the processing module 20, the display control module 30) of the calculation device 100 according to the present embodiment can be implemented by causing a computer to execute a computer program (software), as an example. The computer program that causes a computer to implement the functions such as the setting module 10, the processing module 20, and the display control module 30 are recorded on, for example, a magnetic disc (flexible disc, hard disc, etc.), an optical disc (CD-ROM, CD-R, CD-RW, DVD-ROM, DVD±R, DVD±RW, Blu-ray (registered trademark) disc, etc.), a semiconductor memory, or a similar recording medium. The recording medium storing the computer program may be any computer-readable recording medium in any storage format. The computer program may be installed in a computer in advance, or the computer program distributed over a network may be installed on a computer when necessary.

For example, the computer program executed by a computer has a module configuration including functional units (the setting module 10, the processing module 20, the display control module 30) of the calculation device 100 according to the present embodiment. The actual hardware is configured, for example, such that the first processor circuit 101 and the second processor circuit 102 read and execute the computer program so that these units are loaded into the main storage unit 103 and generated on the main storage unit 103.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A calculation device solving an Ising problem, the calculation device comprising:

a memory; and one or more processors coupled to the memory, wherein the Ising problem includes N Ising spins and an intensity of interaction between an $i^{th}$ Ising spin and a $j^{th}$ Ising spin among the N Ising spins is represented by a matrix $J_{i,j}$, N being an integer equal to or greater than 2, i being an integer equal to or greater than 1 and equal to or smaller than N, j being an integer different from i and equal to or greater than 1 and equal to or smaller than N;

the memory stores therein N first variables $x_i$ and N second variables $y_i$;

the N first variables $x_i$ correspond to N virtual particles on a one-to-one basis;

the N second variables $y_i$ correspond to the N virtual particles on a one-to-one basis;

the N virtual particles correspond to the N Ising spins on a one-to-one basis;

each of the N first variables $x_i$ represents a position of a corresponding virtual particle in the N virtual particles in a range of a predetermined negative value or greater and a predetermined positive value or smaller;

each of the N second variables $y_i$ represents a momentum in the corresponding virtual particle in the N virtual particles; and the one or more processors are configured to:

acquire the matrix $J_{i,j}$ representing the Ising problem;

initialize the N first variables $x_i$ and the N second variables $y_i$ stored in the memory;

perform a processing of alternating a first variable update of updating the N first variables $x_i$ stored in the memory and a second variable update of updating the N second variables $y_i$ stored in the memory until an end condition is satisfied; and display an image on a display device; and output a solution representing the N Ising spins after performing the processing of alternating the first variable update and the second variable update until the end condition is satisfied, wherein each of the N Ising spins included in the solution represents a sign of the first variable $x_i$ after updating that is generated by a last first variable update for a corresponding first variable $x_i$ among the N first variables $x_i$, the first variable update includes generating, for each of the N first variables $x_i$, a first value after updating that represents a position of the corresponding virtual particle time-evolved for an amount of time dt by using an equation of motion, by adding a value obtained by a first function to the first value before updating, the second variable update includes generating, for each of the N second variables $y_i$, a second value after updating that represents a momentum in the corresponding virtual particle time-evolved for the amount of the time dt by using the equation of motion, by adding a value obtained by a second function and a value obtained by a third function to the second value before updating, variables of the first function include a second variable $y_i$ corresponding to a first variable $x_i$ to be updated among the N second variables $y_i$, variables of the second function include a first variable $x_i$ corresponding to a second variable $y_i$ to be updated among the N first variables $x_i$, and the third function includes a product-sum operation of the matrix $J_{i,j}$ and N first variables $x_j$, and the one or more processors are further configured to, per predetermined times of executions of the first variable update and the second variable update:

output the first value after updating for each of the N first variables $x_i$ and the second value after updating for each of the N second variables $y_i$; and display on the display device a monitoring image representing a temporal change in at least some of the N first variables $x_i$ and the N second variables $y_i$, based on the first value after updating that is output for each of the N first variables $x_i$ and the second value after updating that is output for each of the N second variables $y_i$.

2. The calculation device according to claim 1, wherein the one or more processors are configured to display, on the display device, the monitoring image in which temporal changes in at least some of N coordinate points $(x_i, y_i)$ corresponding to the N Ising spins are plotted on two-dimensional coordinates, and each of the N coordinate points $(x_i, y_i)$ is represented by a pair of a value of a corresponding first variable $x_i$ among the N first variables $x_i$ and a value of a corresponding second variable $y_i$ among the N second variables $y_i$.

3. The calculation device according to claim 2, wherein the one or more processors are configured to: plot at least some of the N coordinate points $(x_i, y_i)$ on two-dimensional coordinates divided into a plurality of small blocks; and display on the display device the monitoring image representing each of the small blocks in a gray level according to a number of plots in a corresponding block.

4. The calculation device according to claim 3, wherein the one or more processors are configured to represent each temporal change in at least some of the N coordinate points $(x_i, y_i)$ on a two-dimensional coordinate as a locus.

5. The calculation device according to claim 4, wherein the one or more processors are configured to represent a locus of each of the N coordinate points $(x_i, y_i)$ on the two-dimensional coordinate by connecting each of at least some of the N coordinate points $(x_i, y_i)$ with a line per predetermined times of executions of the first variable update and the second variable update.

6. The calculation device according to claim 2, wherein the one or more processors are configured to represent each temporal change in at least some of the N coordinate points $(x_i, y_i)$ on a two-dimensional coordinate as a locus.

7. The calculation device according to claim 6, wherein the one or more processors are configured to represent a locus of each of the N coordinate points $(x_i, y_i)$ on the two-dimensional coordinate by connecting each of at least some of the N coordinate points $(x_i, y_i)$ with a line per predetermined times of executions of the first variable update and the second variable update.

8. The calculation device according to claim 1, wherein the one or more processors are configured to display, on the display device, the monitoring image including at least one of a first graph representing a temporal change in at least some of the N first variables $x_i$ and a second graph representing a temporal change in at least some of the N second variables $y_i$.

9. The calculation device according to claim 1, wherein the first function is $dt*D*y_i$, D being a constant; and the second function is $dt*[(p-D-x_i*x_i)*x_i]$, p changing from zero to a large value with passage of time.

10. A computer program product comprising a non-transitory computer-readable medium including programmed instructions stored thereon, wherein, when executed by a computer of a calculation device solving an Ising problem and further including a memory coupled to the computer, the Ising problem including N Ising spins and an intensity of interaction between an $i^{th}$ Ising spin and a $j^{th}$ Ising spin among the N Ising spins being represented by a matrix $J_{i,j}$, N being an integer equal to or greater than 2, i being an integer equal to or greater than 1 and equal to or smaller than N, j being an integer different from i and equal to or greater than 1 and equal to or smaller than N, the memory storing therein N first variables $x_i$ and N second variables $y_i$, the N first variables $x_i$ corresponding to N virtual particles on a one-to-one basis, the N second variables $y_i$ corresponding to the N virtual particles on a one-to-one basis, the N virtual particles corresponding to the N Ising spins on a one-to-one basis, each of the N first variables $x_i$, representing a position of a corresponding virtual particle in the N virtual particles in a range of a predetermined negative value or greater and a predetermined positive value or smaller, and each of the N second variables $y_i$ representing a momentum in the corresponding virtual particle in the N virtual particles, the instructions cause the computer to execute:

acquiring the matrix $J_{i,j}$ representing the Ising problem;

initializing the N first variables $x_i$ and the N second variables $y_i$ stored in the memory;

performing a processing of alternating a first variable update of updating the N first variables $x_i$ stored in the memory and a second variable update of updating the N second variables $y_i$ stored in the memory until an end condition is satisfied;

outputting a solution representing the N Ising spins after performing the processing of alternating the first variable update and the second variable update until the end condition is satisfied, wherein each of the N Ising spins included in the solution representing a sign of the first variable $x_i$ after updating that is generated by a last first variable update for a corresponding first variable $x_i$ among the N first variables $x_i$, the first variable update including generating, for each of the N first variables $x_i$, a first value after updating that represents a position of the corresponding virtual particle time-evolved for an amount of time dt by using an equation of motion, by adding a value obtained by a first function to the first value before updating, the second variable update including generating, for each of the N second variables $y_i$, a second value after updating that represents a momentum in the corresponding virtual particle time-evolved for the amount of the time dt by using the equation of motion, by adding a value obtained by a second function and a value obtained by a third function to the second value before updating, variables of the first function including a second variable $y_i$ corresponding to a first variable $x_i$ to be updated among the N second variables $y_i$, variables of the second function including a first variable $x_i$ corresponding to a second variable $y_i$ to be updated among the N first variables $x_i$, the third function including a product-sum operation of the matrix $J_{i,j}$ and N first variables $x_j$, per predetermined times of executions of the first variable update and the second variable update, outputting the first value after updating for each of the N first variables $x_i$ and the second value after updating for each of the N second variables $y_i$; and displaying on a display device a monitoring image representing a temporal change in at least some of the N first variables $x_i$ and the N second variables $y_i$, based on the first value after updating that is output for each of the N first variables $x_i$ and the second value after updating that is output for each of the N second variables $y_i$.

* * * * *